(12) United States Patent
Song et al.

(10) Patent No.: US 11,908,227 B2
(45) Date of Patent: Feb. 20, 2024

(54) METHOD AND DEVICE FOR REFERENCE IMAGING AND OPTICAL OBJECT RECOGNITION

(71) Applicant: SAMSUNG ELECTRONICS CO., LTD., Suwon-si (KR)

(72) Inventors: Moonkyu Song, Suwon-si (KR); Seongwook Song, Suwon-si (KR); Taeui Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 435 days.

(21) Appl. No.: 16/988,793

(22) Filed: Aug. 10, 2020

(65) Prior Publication Data

US 2021/0150176 A1 May 20, 2021

(30) Foreign Application Priority Data

Nov. 20, 2019 (KR) .................. 10-2019-0149268

(51) Int. Cl.
| | |
|---|---|
| *G06V 40/13* | (2022.01) |
| *G06F 3/041* | (2006.01) |
| *G06V 10/30* | (2022.01) |
| *G06V 10/98* | (2022.01) |
| *G06V 40/12* | (2022.01) |

(52) U.S. Cl.
CPC ........ *G06V 40/1318* (2022.01); *G06F 3/0412* (2013.01); *G06V 10/30* (2022.01); *G06V 10/993* (2022.01); *G06V 40/1341* (2022.01)

(58) Field of Classification Search
None
See application file for complete search history.

(56) References Cited

U.S. PATENT DOCUMENTS

| | | | |
|---|---|---|---|
| 8,004,502 B2 | 8/2011 | Keam | |
| 9,524,061 B2 | 12/2016 | McCaughan et al. | |
| 10,410,033 B2 | 9/2019 | He et al. | |
| 10,410,036 B2 | 9/2019 | He et al. | |
| 10,410,037 B2 | 9/2019 | He et al. | |
| 10,437,974 B2 | 10/2019 | He et al. | |
| 10,438,046 B2 | 10/2019 | He et al. | |
| 2006/0056700 A1* | 3/2006 | Abiko .................. | G06V 10/993 382/190 |

(Continued)

FOREIGN PATENT DOCUMENTS

| | | |
|---|---|---|
| JP | 2011-0118465 | 6/2011 |
| KR | 10-2018-0005588 | 1/2018 |

(Continued)

*Primary Examiner* — Benjamin X Casarez
(74) *Attorney, Agent, or Firm* — F. Chau & Associates, LLC

(57) ABSTRACT

In a method of obtaining a reference image for optical object recognition, first light sources among a plurality of light sources included in a display panel are driven where the first light sources are disposed to correspond to an object recognition window which is a partial region of the display panel, a plurality of images are contemporaneously obtained based on reflected light received by an object recognition sensor through the object recognition window while driving the first light sources, at least one of the plurality of images is obtained as a first reference image for optical object recognition associated with a first object, and the first reference image is stored.

20 Claims, 21 Drawing Sheets

(56) References Cited

U.S. PATENT DOCUMENTS

| | | | |
|---|---|---|---|
| 2009/0073141 A1 | 3/2009 | Chino | |
| 2011/0234535 A1* | 9/2011 | Hung et al. | |
| 2016/0247010 A1* | 8/2016 | Huang | G06V 40/1365 |
| 2017/0316248 A1 | 11/2017 | He et al. | |
| 2017/0364763 A1* | 12/2017 | Jin | G06F 3/0416 |
| 2018/0012069 A1 | 1/2018 | Chung et al. | |
| 2018/0046281 A1 | 2/2018 | Pi et al. | |
| 2018/0173343 A1 | 6/2018 | Pi et al. | |
| 2018/0260602 A1 | 9/2018 | He et al. | |
| 2018/0306640 A1 | 10/2018 | Pang et al. | |
| 2018/0348949 A1 | 12/2018 | Kim et al. | |
| 2018/0349667 A1 | 12/2018 | Kim et al. | |
| 2018/0349669 A1* | 12/2018 | Kim | G06F 3/041 |
| 2018/0365470 A1 | 12/2018 | Li et al. | |
| 2019/0188442 A1* | 6/2019 | Flament | G06V 40/1306 |
| 2019/0347463 A1* | 11/2019 | Lee | G06V 40/1365 |
| 2021/0264575 A1* | 8/2021 | Zhang | G06V 40/1347 |
| 2022/0292644 A1* | 9/2022 | Cheng | G06V 10/30 |

FOREIGN PATENT DOCUMENTS

| | | |
|---|---|---|
| KR | 10-1924916 | 11/2018 |
| KR | 1020180132496 | 12/2018 |

* cited by examiner

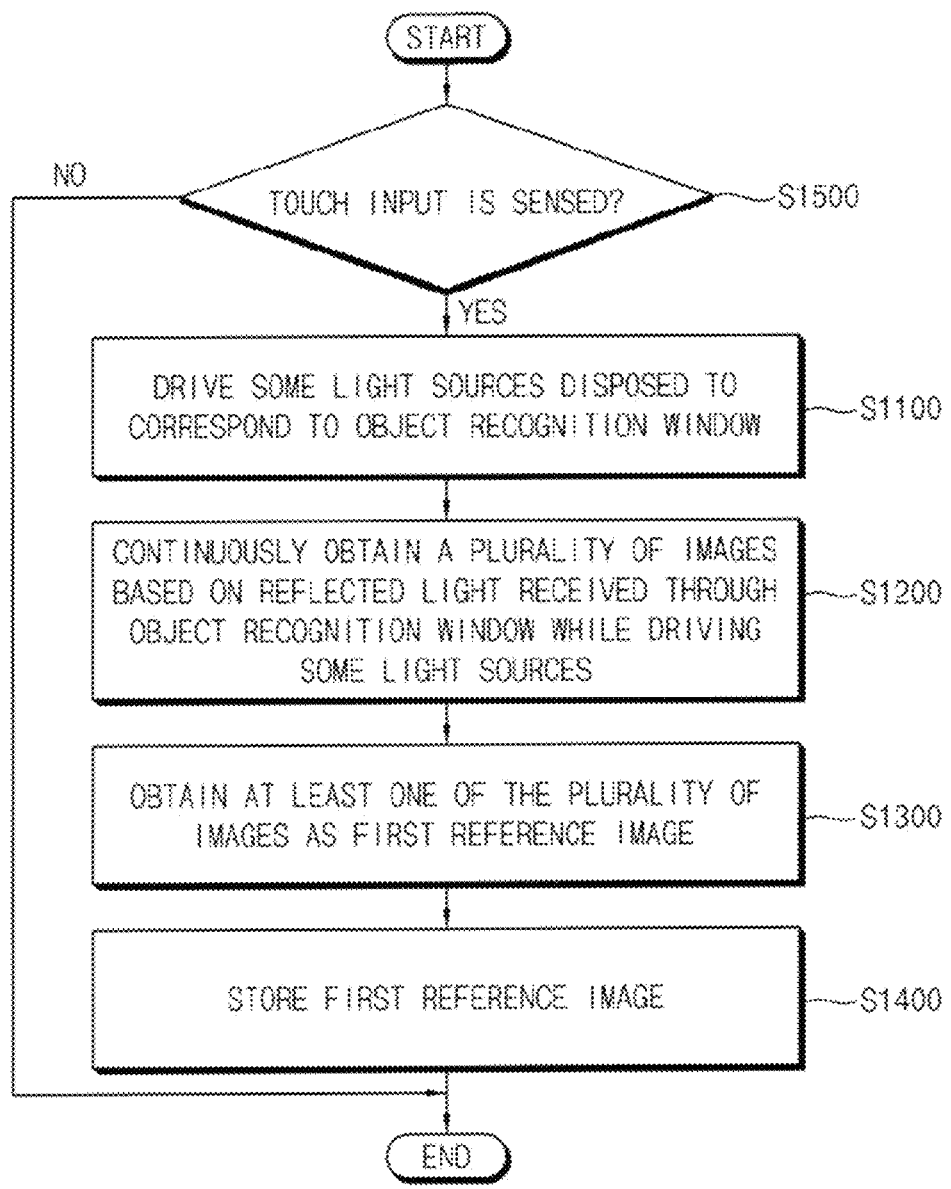

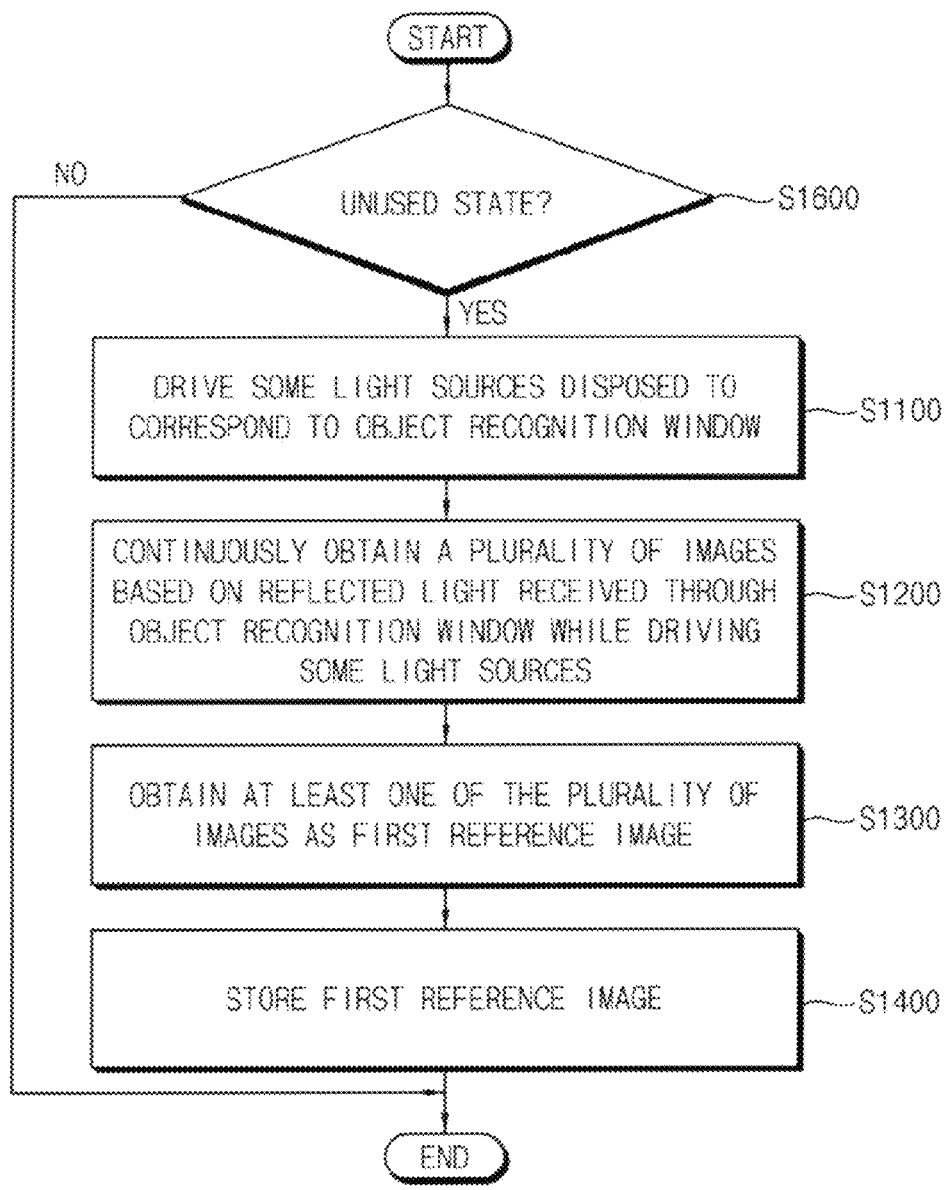

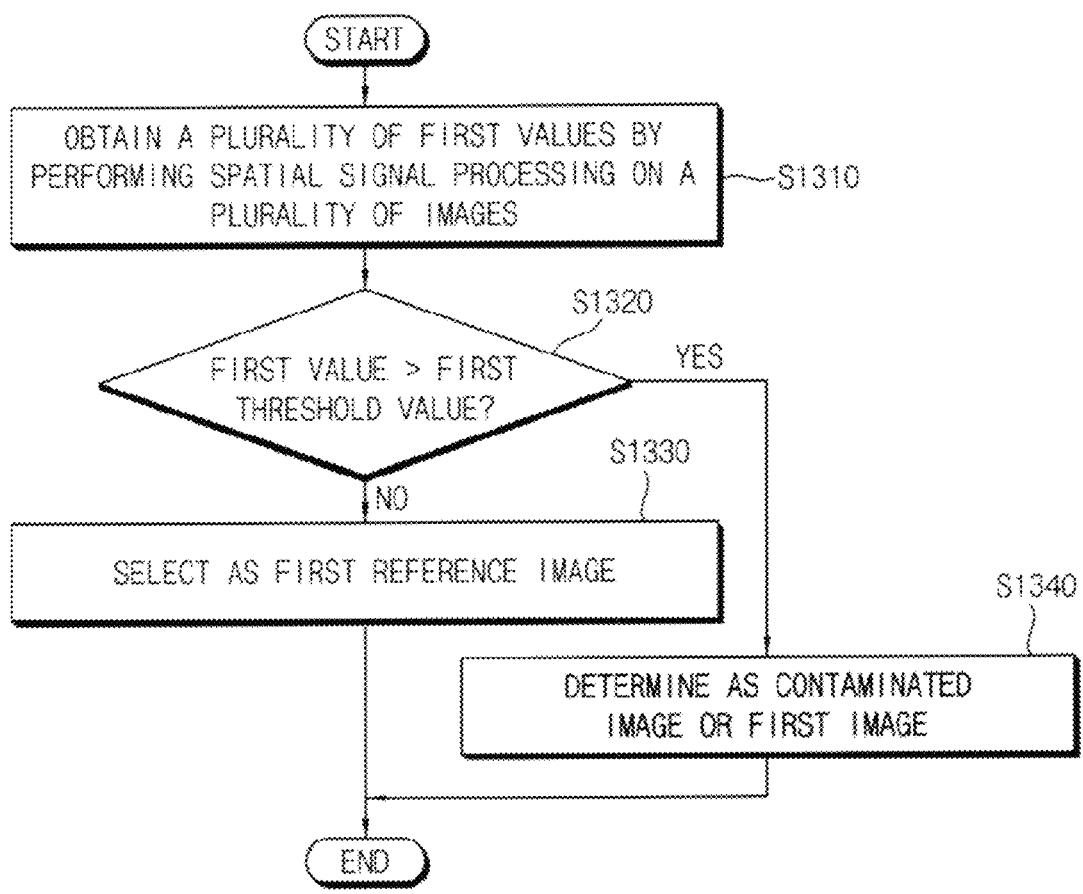

METHOD AND DEVICE FOR REFERENCE IMAGING AND OPTICAL OBJECT RECOGNITION

CROSS-REFERENCE TO RELATED APPLICATION

This application claims priority under 35 USC § 119 to Korean Patent Application No. 10-2019-0149268, filed on Nov. 20, 2019 in the Korean Intellectual Property Office (KIPO), the contents of which are herein incorporated by reference in their entirety.

TECHNICAL FIELD

Exemplary embodiments relate generally to semiconductor integrated circuits, and more particularly to methods of obtaining reference images for optical object recognition.

DISCUSSION OF RELATED ART

Biometric information is widely used in personal authentication because of its invariability and uniqueness. One type of biometric information is a fingerprint. Fingerprint recognition may be performed conveniently, and serves as an excellent way of determining the identity of a person. Optical fingerprint recognition obtains a fingerprint image based on differences in light reflected by ridges and valleys of a finger. Optical object recognition may be used for obtaining an object image based on light reflected by various objects.

SUMMARY

An exemplary embodiment of the present disclosure provides a method of obtaining a reference image for optical object recognition.

An exemplary embodiment of the present disclosure provides a method of performing optical object recognition using the method of obtaining the reference image.

An exemplary embodiment of the present disclosure provides an electronic device performing the method of obtaining the reference image and the method of performing optical object recognition.

According to an exemplary embodiment, in a method of obtaining a reference image for optical object recognition, first light sources among a plurality of light sources included in a display panel are driven. The first light sources are disposed to correspond to an object recognition window which is a partial region of the display panel. A plurality of images are continuously obtained based on reflected light received by an object recognition sensor through the object recognition window while driving the first light sources. At least one of the plurality of images is obtained as a first reference image for optical object recognition associated with a first object. The first reference image is stored.

According to an exemplary embodiment, in a method of performing optical object recognition, first light sources among a plurality of light sources included in a display panel are driven. The first light sources are disposed to correspond to an object recognition window which is a partial region of the display panel. A plurality of images are continuously obtained based on reflected light received by an object recognition sensor through the object recognition window while driving the first light sources. At least one image among the plurality of images is obtained as a first reference image. The first reference image is an image that does not include a first object. At least another one image among the plurality of images is obtained as a first image. The first image is an image that includes the first object. A first effective image for the first object is obtained based on the first image and the first reference image.

According to an exemplary embodiment, an electronic device includes a display panel, an object recognition sensor, a processor and a memory. The display panel includes a plurality of light sources, and drives first light sources among the plurality of light sources to display an object recognition window on a partial region of the display panel. The object recognition sensor continuously obtains a plurality of images based on reflected light received through the object recognition window while driving the first light sources. The processor obtains at least one of the plurality of images as a first reference image for optical object recognition associated with a first object. The first reference image is an image that does not include the first object. The memory stores the first reference image.

In the method of obtaining the reference image for optical object recognition, the method of performing optical object recognition, and the electronic device according to exemplary embodiments, an object-free image or an image without an object (e.g., the reference image) used to perform the optical object recognition may be efficiently obtained. In addition, the object-free image and the image including the object may be selected from the plurality of images continuously obtained in the same environment such that the characteristics of noise, interference, and the like between the object-free image and the image including the object are substantially equal to or matched with each other. Accordingly, the robust object image restoration may be performed or the pure information associated with the object may be robustly restored based on the object-free image, and efficient optical object recognition may be supported.

According to an exemplary embodiment, a biometric device includes a plurality of light-emitting pixels disposed behind a pattern recognition window of a larger display panel; a plurality of light-sensing pixels disposed behind the light-emitting pixels in a reflective light path from the pattern recognition window; and a plurality of memory cells in signal communication with the plurality of light-sensing pixels, respectively, wherein the plurality of memory cells is configured to receive from the plurality of light-sensing pixels a reference image indicative of a shadow cast by at least the plurality of light-emitting pixels when light emitted by the plurality of light-emitting pixels is reflected back through the pattern recognition window.

The biometric device may have the plurality of memory cells further configured to subtract the reference image from a raw image acquired by the light-sensing pixels to form a pure biometric pattern image. The biometric device may have the pure biometric pattern image indicative of at least one of a fingerprint, an iris, or a face. The biometric device may have the reference image and the raw image obtained contemporaneously. The biometric device may further include a touch sensor configured to activate at least one of the plurality of light-emitting pixels or the plurality of light-sensing pixels. The biometric device may further include a plurality of optical devices disposed in front of the plurality of light-sensing pixels to concentrate or focus reflected light upon the plurality of light-sensing pixels.

BRIEF DESCRIPTION OF THE DRAWINGS

Illustrative, non-limiting exemplary embodiments of the present disclosure will be more clearly understood from the following detailed description taken in conjunction with the accompanying drawings, in which:

FIG. 6 is a flowchart diagram illustrating an exemplary method of obtaining the reference image of FIG. 1;

FIG. 7 is flowchart diagram illustrating an exemplary method of obtaining the reference image of FIG. 1;

FIG. 8 is a flowchart diagram illustrating an exemplary method of obtaining at least one of a plurality of images as a first reference image in FIG. 1;

DETAILED DESCRIPTION

Figure 1:
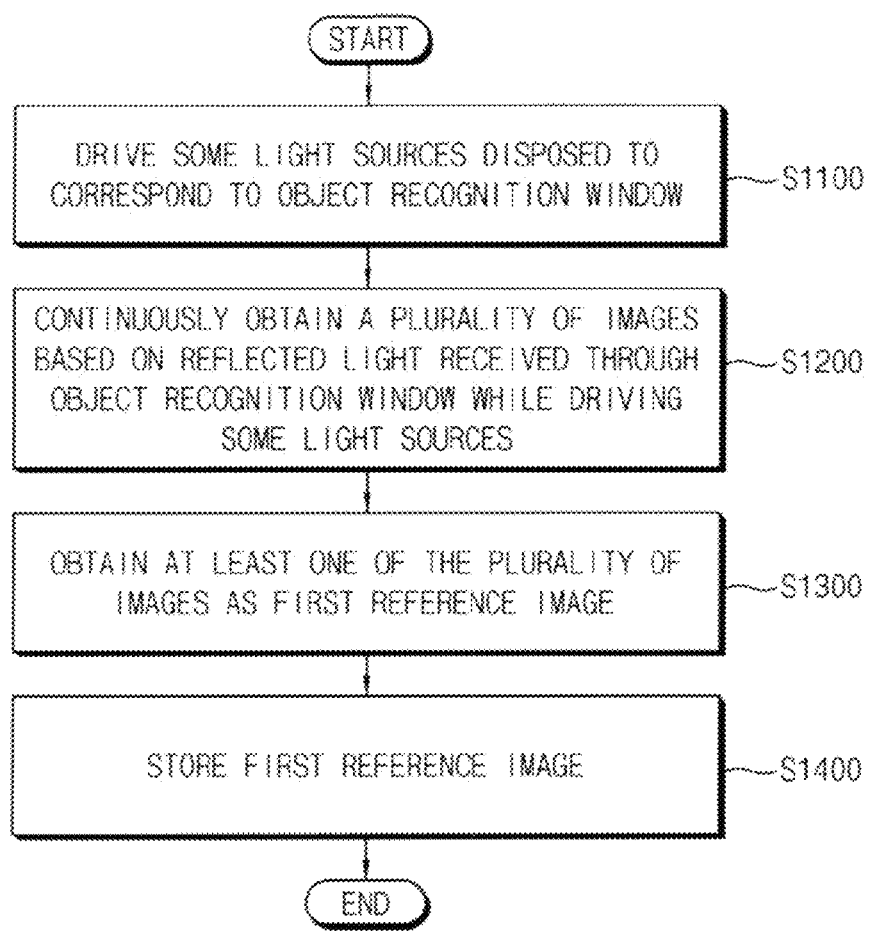
FIG. 1 is a flowchart diagram illustrating a method of obtaining a reference image for optical object recognition according to an exemplary embodiment.

Exemplary embodiments will be described more fully with reference to the accompanying drawings. The present disclosure may, however, be embodied in many different forms and should not be construed as limited to the embodiments set forth herein. Like reference numerals may refer to like elements throughout this application.

FIG. 1 illustrates a method of obtaining a reference image for optical object recognition according to an exemplary embodiment.

Referring to FIG. 1, a method of obtaining a reference image for optical object recognition, according to an exemplary embodiment, is performed by an electronic device that includes a display panel and an object recognition sensor. The display panel includes a plurality of light sources, and the object recognition sensor performs the optical object recognition using light provided from the plurality of light sources. Detailed configuration of the electronic device will be described with reference to FIGS. 2 through 4.

In the method of obtaining the reference image for the optical object recognition according to an exemplary embodiment, at function block S1100, first light sources among the plurality of light sources included in the display panel are driven. The first light sources are disposed to correspond to an object recognition window which is a partial region of the display panel. According to the exemplary embodiment, all of the first light sources may emit light to have the same grayscale value, or the first light sources may emit light to have different grayscale values. In alternate embodiments, some of the first light sources may emit light of different color values.

At function block S1200, while driving the first light sources, a plurality of images are continuously obtained or captured based on reflected light received by the object recognition sensor through the object recognition window. For example, all of the first light sources may be substantially simultaneously, or concurrently, turned on. Light generated from the first light sources may be emitted to the object recognition window and may be reflected by an object back onto the object recognition window. The reflected light may be provided to the object recognition sensor, and thus the object recognition sensor may obtain an image corresponding to the object recognition window and/or the object based on the reflected light. For example, the object recognition sensor may continuously or sequentially obtain several images corresponding to the object recognition window and/or the object based on the reflected light.

At function block S1300, at least one of the plurality of images is obtained or acquired as a first reference image for the optical object recognition associated with a first object. At function block S1400, the first reference image is stored. The most suitable or optimal reference image may be selected from the plurality of images to be stored as the first reference image.

In an exemplary embodiment, the first reference image may be an image that does not include the first object. Typically, a panel including a display panel and a touch sensor panel has a complicated internal structure including patterns of multi-layered wirings, electrodes, and the like. When an object is placed on an object recognition window while light sources in the object recognition window are illuminated, reflected light received through the object recognition window includes information of the object and information of the internal structure of the panel, such as its bottom view. Thus, in order to distinguish the information of the object, information on the internal structure of the panel, which is an interference component, may be obtained first, and then a compensation for removing the interference component from an image signal obtained from the object may be performed. The first reference image may represent the interference component, and may be referred to as a calibration image or calibration data. Although the reference image may be obtained before the first image of the object in this embodiment, the present disclosure is not limited thereto. For example, the reference image may be obtained after obtaining the first image of the object.

In an exemplary embodiment, the first reference image may be an image that does not include the first object, and the plurality of images may include a first image that does include the first object. In this example, the first reference image may be an image obtained immediately before or immediately after the first image among the plurality of images that are continuously obtained. The most suitable reference image obtained in the same environment as the first image may be an image captured immediately before or after the first image is captured.

In an exemplary embodiment, the first object may be a user's finger and the first image may include a fingerprint of the user. In this example, the object recognition window and the object recognition sensor may include a fingerprint recognition window and a fingerprint recognition sensor, respectively. However, embodiments are not limited thereto, and the first object may be an object including other biometric information such as a face or iris for user authentication and security, or may be one of various inanimate objects to be recognized.

In the method of obtaining the reference image for the optical object recognition according to an exemplary embodiment, an object-free image or an image without an object, such as the reference image, may be used to perform the optical object recognition that be efficiently distinguishes only pure information associated with the object by subtracting the object-free image from an image including the object. In addition, the object-free image and the image including the object may each be selected from the plurality of images continuously obtained in the same environment such that the characteristics of noise, interference, or the like between the object-free image and the image including the object are substantially equal to or matched with each other. Accordingly, a robust object image restoration may be performed, or the pure information associated with the object may be robustly restored, based on the object-free image, and efficient optical object recognition may be supported.

Figure 2:
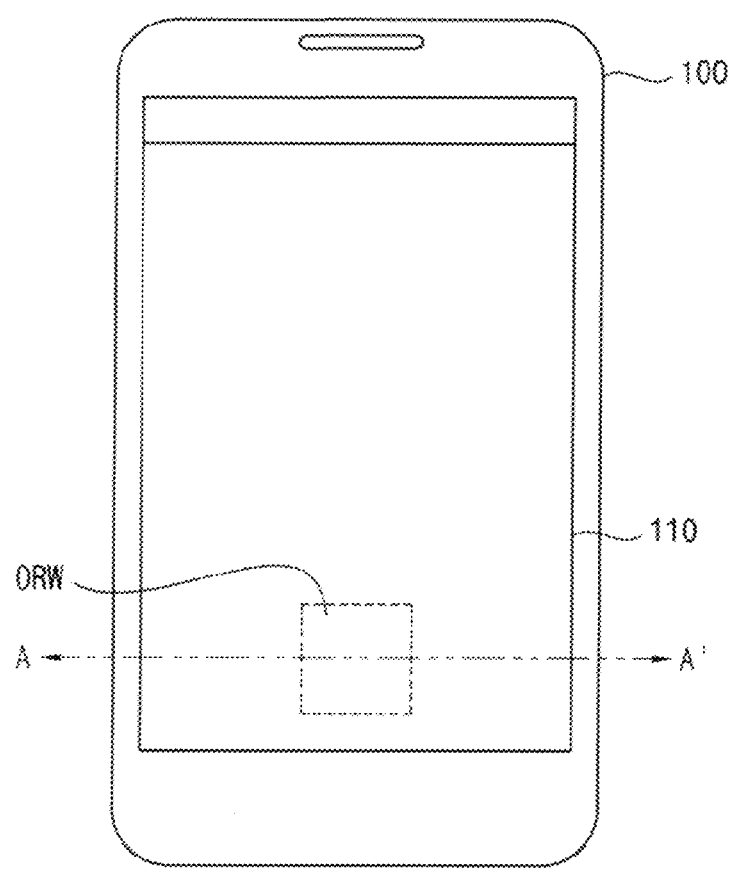
FIG. 2 is a plan view diagram of an electronic device according to an exemplary embodiment.

FIG. 2 illustrates an electronic device according to an exemplary embodiment.

Referring to FIG. 2, an electronic device 100 includes a panel 110 to interface with a user. The user of the electronic device 100 may view information output from the electronic device 100 through the panel 110. The user of the electronic device 100 may input a signal to the electronic device 100 through the panel 110. For example, the panel 110 may include a display panel for outputting visual information to the user, a touch sensor panel for sensing a touch input of the user, and/or the like.

An object recognition window ORW may be provided on the panel 110. As will be described with reference to FIG. 3, an object recognition sensor for object detection may be disposed to spatially correspond to a location of the object recognition window ORW. Although the object recognition window ORW is illustrated as a rectangle in FIG. 2 and subsequent figures, a shape of the object recognition window ORW may be changed in alternate embodiments, without limitation.

In an exemplary embodiment, the electronic device 100 may be or include any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, or the like.

Exemplary embodiments may provide an interface used to detect an object. For example, in the case of fingerprint detection, a function of the fingerprint detection may be performed when the user contacts or approaches the panel 110. According to exemplary embodiments, the interface and the object recognition sensor used for the object detection may share an area on the electronic device 100 with the panel 110, and thus the interface and the object recognition sensor need not occupy an additional area on the electronic device 100. Accordingly, this configuration may support smaller sizes of the electronic device 100, or an unoccupied area may be used for additional features.

Figure 3:
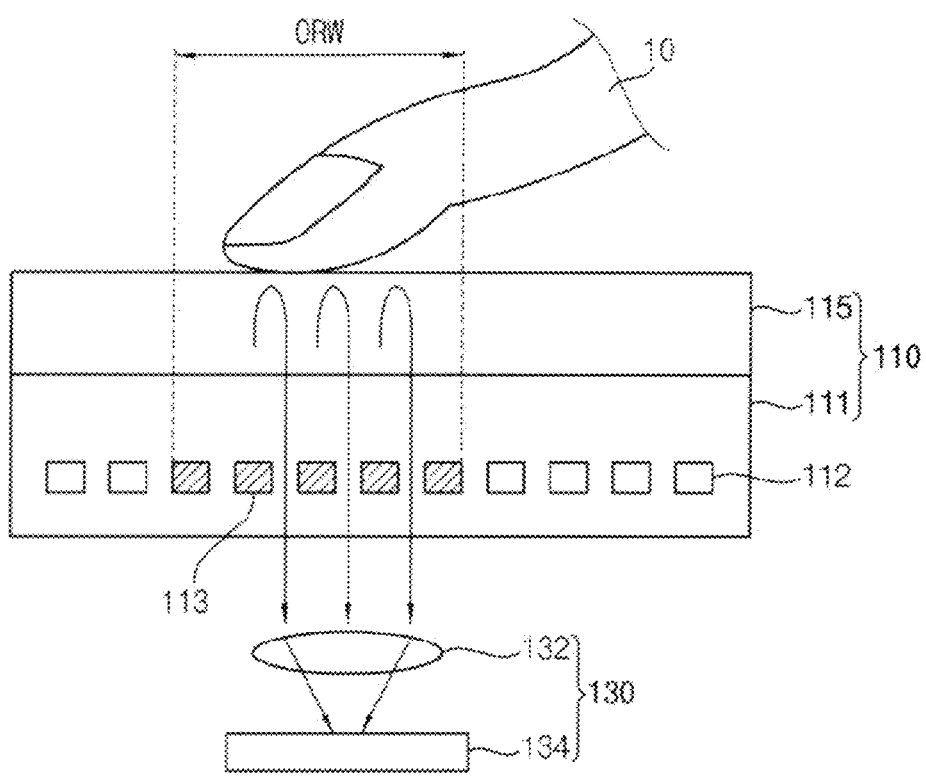
FIG. 3 is a hybrid schematic cross-sectional view diagram of an exemplary electronic device taken along a line A-A' of FIG. 2.

FIG. 3 is a cross-sectional view of the exemplary electronic device 100 taken along a line A-A' of FIG. 2.

Referring to FIG. 3, the object recognition window ORW may be displayed on a partial region (or portion) of the panel 110 in an object recognition mode. The panel 110 may include a display panel 111 and a touch sensor panel 115. Although this exemplary embodiment shows the display panel 111 under the touch sensor panel 115, the relative positions are not limited thereto. For example, the touch sensor panel may be under or integral with the display panel.

The display panel 111 may include a plurality of light sources 112. For example, as will be described with reference to FIG. 4, the plurality of light sources 112 may be included in a plurality of pixels included in the display panel 111. Among the plurality of light sources 112, first light sources 113 that are disposed to correspond to the object recognition window ORW may be driven substantially simultaneously in the object recognition mode. In FIG. 3, the first light sources 113 that are driven and emit light are shown therein as hatched.

An object recognition sensor 130 may be disposed under the panel 110 such that the object recognition sensor 130 may overlap the object recognition window ORW in a vertical direction. In other words, the panel 110 may include a first surface on which an image is displayed and a second surface opposite to the first surface, and the object recognition sensor 130 may be disposed under the second surface of the panel 110.

The object recognition sensor 130 may include a lens 132 and an image sensor 134. The lens 132 may be disposed under the panel 110, such as disposed between the panel 110 and the image sensor 134, and may concentrate reflected light received through the object recognition window ORW on the image sensor 134. The image sensor 134 may be disposed under the lens 132, and may generate an image signal for an object on the partial region based on the reflected light concentrated by the lens 132. In an alternate embodiment, the lens 132 may be omitted in the object recognition sensor 130. In other embodiments, the lens may be disposed above the first light sources 113 and/or include a plurality of lenses.

For example, in the case of fingerprint detection where a user puts a finger 10 on the object recognition window ORW as illustrated in FIG. 3, light generated from the first light sources 113 within the object recognition window ORW may be reflected by a fingerprint of the finger 10, and reflected light of the fingerprint may be provided to the object recognition sensor 130. The object recognition sensor 130 may capture an image signal for the fingerprint or information associated with a shape of the fingerprint, such as a fingerprint image, based on the reflected light of the fingerprint received through the object recognition window ORW.

In the case of obtaining a reference image for object recognition, an object need not be placed on the object recognition window ORW, or, alternatively, a reference object such as any white or black object that is flat without substantial bending may be disposed on the object recognition window ORW to facilitate obtaining the reference image, and reflected light based on light generated from the first light sources 113 within the object recognition window ORW may be provided to the object recognition sensor 130.

The object recognition sensor 130 may capture an image signal for the reference image, such as an image representing the internal structure of the panel 110 from an underside view, based on the reflected light received through the object recognition window ORW.

Optionally, the object recognition sensor 130 may further include a filter for adjusting a frequency characteristic and/or a polarization characteristic of the reflected light to be passed to the image sensor 134.

Figure 4:
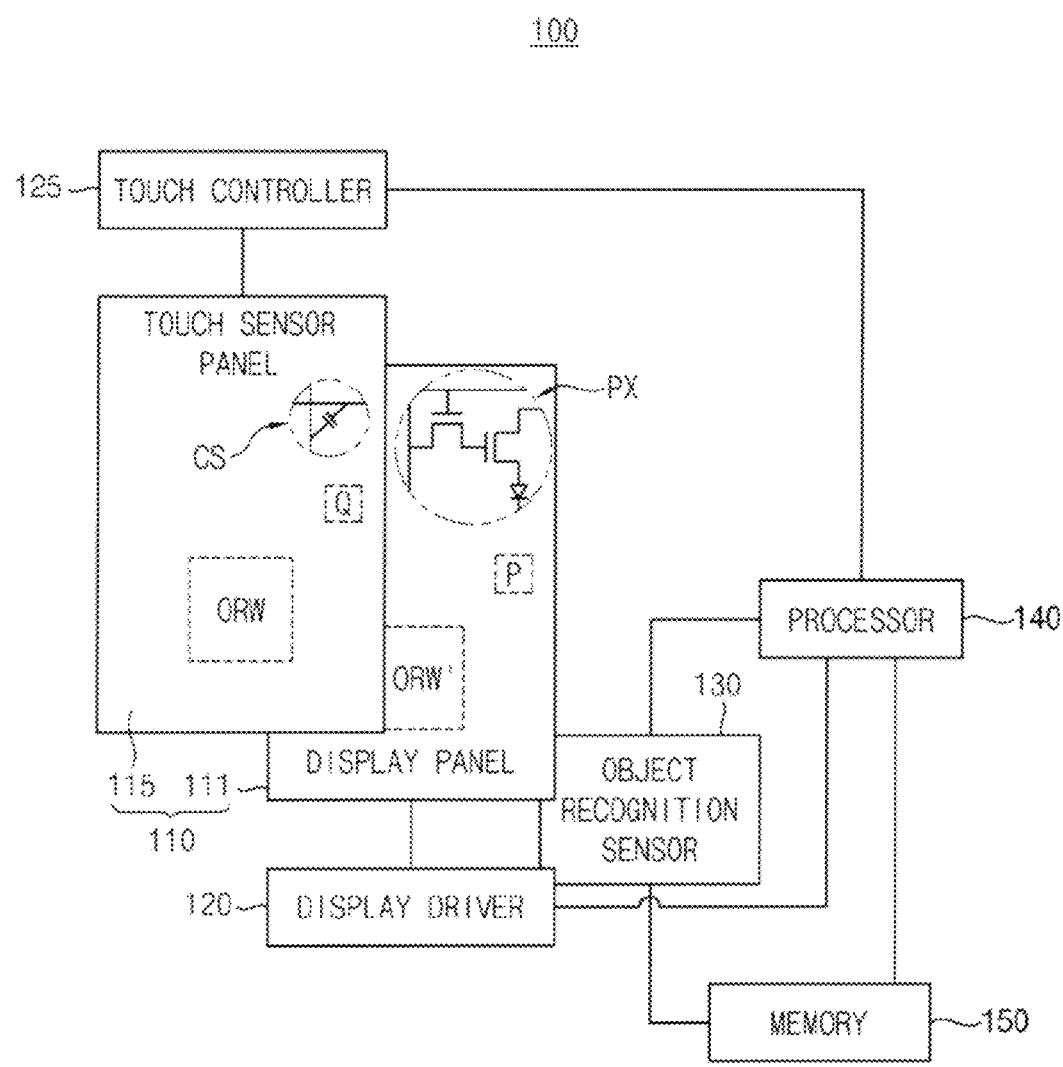
FIG. 4 is a schematic block diagram illustrating an exemplary electronic device of FIG. 2.

FIG. 4 illustrates an exemplary electronic device of FIG. 2.

Referring to FIG. 4, the electronic device 100 includes the panel 110 and the object recognition sensor 130. The panel 110 may include the display panel 111 and the touch sensor panel 115. The electronic device 100 may further include a display driver 120, a touch controller 125, a processor 140 and a memory 150.

The touch sensor panel 115 may sense contact or proximity of an object, such as a finger of the user, without limitation. The touch sensor panel 115 may generate a sensing signal in response to the contact or proximity of the object. The touch sensor panel 115 may include a plurality of sensing capacitors, for example, which are formed along rows and columns. FIG. 4 illustrates one exemplary sensing capacitor CS. Capacitance values of the sensing capacitors may vary in response to the contact or proximity of the object.

The touch controller 125 may control operations of the touch sensor panel 115. The touch controller 125 may process an operation associated with the contact or proximity of the object based on a sensing signal output from the touch sensor panel 115. For example, the touch controller 125 may recognize the contact or proximity of the object based on variation in the capacitance values of the sensing capacitors. When the sensing signal is associated with execution or operation of a specific application, the touch controller 125 may output an interrupt or command to the processor 140 such that the specific application is executed or operates.

The display panel 111 outputs visual information to the user. The display panel 111 may include the plurality of pixels 112 which are arranged along rows and columns to display an image. FIG. 4 illustrates one exemplary pixel PX. Each pixel may be configured to emit light of a specific color, which, in combination with the light from the other pixels, forms the image. As the plurality of pixels emit light together, the display panel 111 may display a desired or intended image.

In an exemplary embodiment, the display panel 111 may be an electroluminescent display panel. The electroluminescent display panel may be driven with a rapid response speed and low power consumption using a light emitting diode (LED) or an organic light emitting diode (OLED) that generates light by recombination of electrons and holes, for example. In comparison with a liquid crystal display panel using a backlight unit, pixels of the electroluminescent display panel may emit light by themselves, and the reflected light received through the object recognition window ORW (or an object recognition window ORW') may be provided to the object recognition sensor 130 under the display panel 111 through a space or gap between the pixels. Thus, light emitting diodes or organic light emitting diodes included in the pixels may correspond to the light sources included in the display panel according to exemplary embodiments. However, exemplary embodiments are not limited thereto, and the display panel 111 may be any display panel having a structure in which the reflected light received through the object recognition window ORW or ORW' may be provided to the object recognition sensor 130, such as by optical fibers disposed between the pixels, without limitation.

The display driver 120 may control operations of the display panel 111 and may drive the display panel 111. For example, the display driver 120 may suitably drive each pixel of the display panel 111 in response to a command of the processor 140 such that the desired or intended image is displayed on the display panel 111. For example, the display driver 120 may partially drive the display panel 111 such that pixels corresponding to the object recognition window ORW' emit light. The display driver 120 may include a data driver, a scan driver, a timing controller, a gamma circuit, or the like.

Each coordinate on the touch sensor panel 115 may be matched with each coordinate on the display panel 111. For example, the display panel 111 may display interface information on a specific area P. The user may contact or approach a specific area Q on the touch sensor panel 115 to input a command through the displayed interface information. Herein, a coordinate of the specific area Q may be matched with a coordinate of the specific area P. Accordingly, contact or proximity on or to the specific area Q may be processed in association with the interface information displayed on the specific area P. Such coordinate matching may also be used between the object recognition window ORW of the sensor panel 115 and the object recognition window ORW' of the display panel 111.

In an exemplary embodiment, the touch sensor panel 115 may be implemented separately from the display panel 111. For example, as illustrated in FIG. 4, the touch sensor panel 115 may be placed on or over the display panel 111. However, exemplary embodiments are not limited thereto. For another example, the display panel 111 may be placed on or over the touch sensor panel 115. Alternatively, the touch sensor panel 115 and the display panel 111 may be implemented in one single panel.

The object recognition sensor 130 may be used to detect an object. The object recognition sensor 130 may generate/output an image signal associated with the object which is on the object recognition window ORW. For example, in the case of the fingerprint detection, the object recognition sensor 130 may operate to obtain an image signal associated with a fingerprint of a finger which contacts or approaches the object recognition window ORW. The object recognition sensor 130 may include the lens 132 and the image sensor 134 of FIG. 3.

The object recognition sensor 130 may provide a function of optical object recognition or optics-based object detection. For example, the image sensor 134 included in the object recognition sensor 130 may include photo-diode(s) capable of generating current in response to light.

The object recognition window ORW may be provided on the panel 110 as described with reference to FIG. 2, for example, on the touch sensor panel 115. In addition, the object recognition window ORW' may be provided on the display panel 111 to correspond to the object recognition window ORW. The object recognition sensor 130 may be disposed under the display panel 111 to spatially correspond to a location of the object recognition window ORW of the sensor panel 115 and a location of the object recognition window ORW' of the display panel 111.

In an exemplary embodiment, the location of the object recognition window ORW may be associated with coordinates on the touch sensor panel 115, and the location of the object recognition window ORW' may be associated with coordinates on the display panel 111. In addition, the location and size of each of the object recognition windows ORW and ORW' may be modified or changed depending on the arrangement of the object recognition sensor 130. In an alternate embodiment, the operational sizes of the object recognition windows ORW and ORW' may be adapted to a user's fingerprint size.

The processor 140 may control overall operations of the electronic device 100. The processor 140 may process/perform various arithmetic/logical operations to provide functions of the electronic device 100.

The processor 140 may communicate with the display driver 120, the touch controller 125, the object recognition sensor 130 and the memory 150. The processor 140 may control operations of the display driver 120, the touch controller 125, the object recognition sensor 130 and the memory 150. The processor 140 may process commands, requests, responses, and/or the like, which are associated with operations of the display driver 120, the touch controller 125, the object recognition sensor 130 and the memory 150.

For example, the processor 140 may process a command received from the touch controller 125 to understand a user command input through the touch sensor panel 115. The processor 140 may provide a variety of information to the display driver 120 to display the desired or intended image on the display panel 111.

For example, the processor 140 may control an operation timing/sequence of the display panel 111 and the object recognition sensor 130 such that the object recognition sensor 130 generates signals associated with the object image and/or the reference image. The processor 140 may generate and analyze information associated with the object image and/or the reference image based on the signals output from the object recognition sensor 130. For example, the processor 140 may store associated data in the memory 150 or may load the associated data from the memory 150.

In an exemplary embodiment, the processor 140 may include one or more special-purpose circuits, such as a field programmable gate array (FPGA), an application specific integrated chips (ASICs), and/or the like, without limitation, to perform various operations. For example, the processor 140 may include one or more processors or processor cores which are capable of performing various operations. Each processor or core may be implemented with a general-purpose processor, a special-purpose processor, or an application processor.

The memory 150 may store data associated with or related to the operation of the electronic device 100. For example, the memory 150 may store the reference image, and the like, for performing the method of obtaining the reference image according to exemplary embodiments.

In an exemplary embodiment, the memory 150 may include at least one of various volatile memories such as a dynamic random access memory (DRAM), a static random access memory (SRAM), or the like, and/or at least one of various nonvolatile memories such as a flash memory, a phase change random access memory (PRAM), a resistance random access memory (RRAM), a magnetic random access memory (MRAM), a ferroelectric random access memory (FRAM), a nano floating gate memory (NFGM), a polymer random access memory (PoRAM), or the like.

In an exemplary embodiment, the display driver 120, the touch controller 125, the object recognition sensor 130, the processor 140 and the memory 150 may be respectively implemented with separate circuits, modules, and/or chips. In other exemplary embodiments, on the basis of a function, at least one of the display driver 120, the touch controller 125, the object recognition sensor 130, the processor 140 and/or the memory 150 may be combined into one circuit/module/chip, or may be further separated into a plurality of circuits/modules/chips.

The electronic device 100 may perform the method of obtaining the reference image according to exemplary embodiments described with reference to FIG. 1. For example, the display panel 111 and the display driver 120 may perform function block S1100 in FIG. 1, the object recognition sensor 130 may perform function block S1200 in FIG. 1, the processor 140 may perform function block S1300 in FIG. 1, and the memory 150 may perform function block S1400 in FIG. 1, without limitation. In addition, the electronic device 100 may perform a method of performing optical object recognition which may be described in greater detail with reference to FIG. 14.

In an exemplary embodiment, at least some of the components included in the electronic device 100 may be omitted. For example, when touch detection is unnecessary or obviated, the touch sensor panel 115 and the touch controller 125 may be omitted.

FIGS. 5A, 5B, 5C and 5D illustrate a method of obtaining a reference image for optical object recognition according to exemplary embodiments.

Hereinafter, exemplary embodiments will be described in detail based on fingerprint recognition. However, embodiments are not limited thereto, and alternate embodiments may be employed or adopted to recognize alternate and/or additional objects.

Figure 5A:
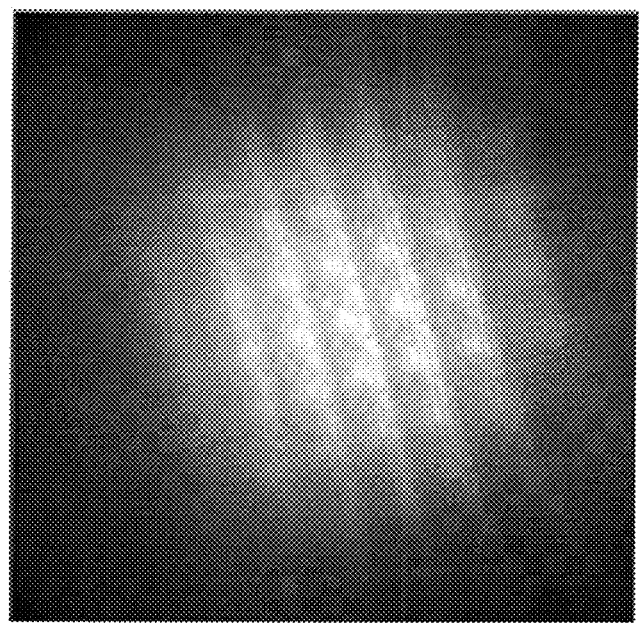
FIGS. 5A, 5B, 5C and 5D are image diagrams for describing a method of obtaining a reference image for optical object recognition according to an exemplary embodiment.

FIG. 5A illustrates an image obtained based on reflected light without a fingerprint, such as of a user, or optionally based on reflected light from an object used for obtaining a reference image. The image of FIG. 5A may correspond to the reference image in FIG. 1 that is obtained by the object recognition sensor, and may include information of the internal structure of the display panel.

Figure 5B:
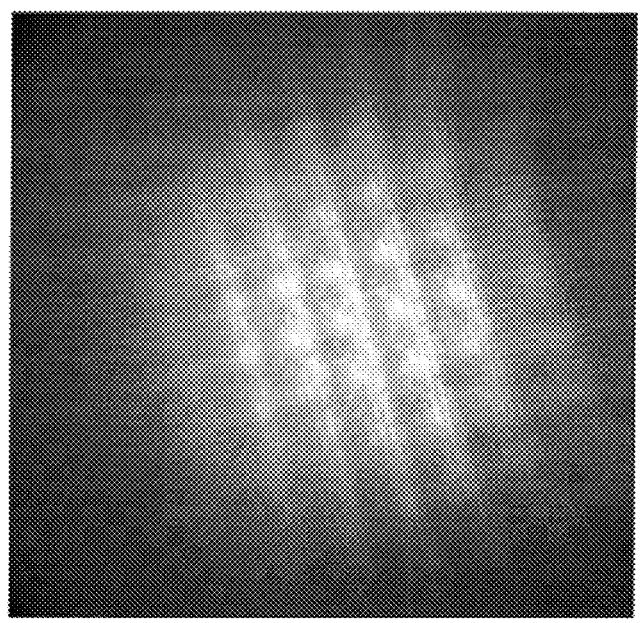

FIG. 5B illustrates an image obtained based on reflected light by an object, such as the fingerprint of a user. The image of FIG. 5B may also be obtained by the object recognition sensor, and may include both the information of the fingerprint and the information of the internal structure of the display panel.

Figure 5C:
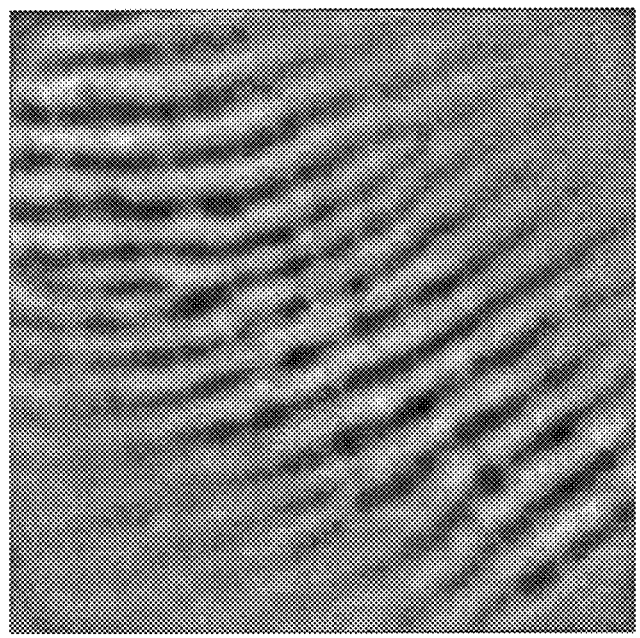
Figure 5D:
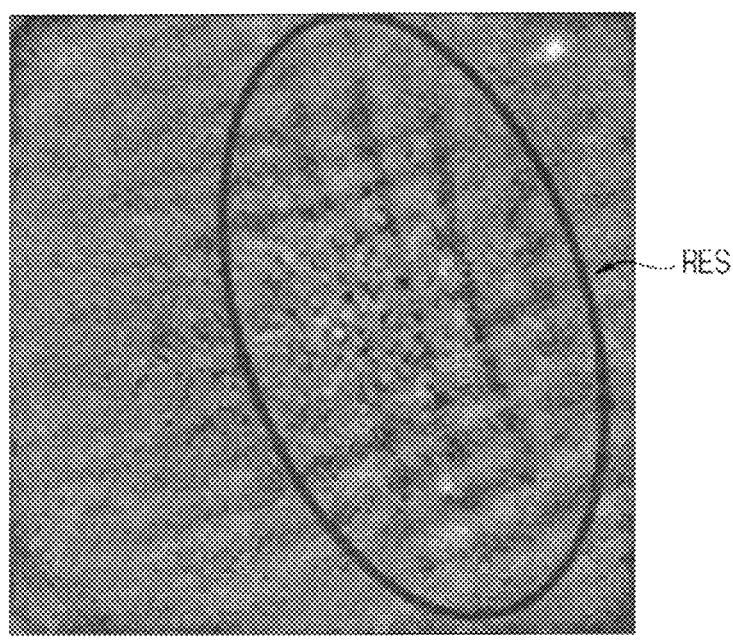

FIGS. 5C and 5D illustrate examples of a pure object image, such as a pure fingerprint image, obtained based on the images of FIGS. 5A and 5B. For example, the image of FIG. 5A including only a pure interference component without the fingerprint may be obtained first, the image of FIG. 5B including both the fingerprint and the interference component may be obtained next, and then a pure fingerprint image may be obtained by performing compensation to remove the interference component. For example, the pure fingerprint image may be obtained by performing a simple surface or face subtraction to obtain a difference between the image of FIG. 5B and the image of FIG. 5A.

As illustrated in FIG. 5C, a pure fingerprint image in which the interference component is completely removed may be obtained. However, as illustrated in FIG. 5D, a residual component RES may remain or may be left without the interference component being completely removed. For example, the interference component may vary depending on temperature and/or pressure when the finger of the user is placed on the object recognition window. Particularly, deformation, such as rotation, scaling, translation, or the like may occur on the interference component in the image of FIG. 5B, and thus the residual component RES may occur because there may be a spatial mismatch between the pure interference component in the image of FIG. 5A and the interference component in the image of FIG. 5B.

To minimize such residual component RES, the at least one of the plurality of images that are continuously obtained may be obtained as the reference image, as described above with reference to FIG. 1.

FIG. 6 illustrates an exemplary method of obtaining the reference image of FIG. 1. Duplicate description with respect to FIG. 1 may be omitted.

Referring to FIG. 6, in the method of obtaining the reference image for the optical object recognition according to this embodiment, at function block S1500, a touch input of a user may be sensed by a touch sensor panel. For example, block S1500 in FIG. 6 may be performed by the touch sensor panel 115 and the touch controller 125 in FIG. 4.

If the touch input is sensed (YES at function block S1500), function blocks S1100, S1200, S1300 and S1400 may be performed to drive the first light sources, to continuously obtain the plurality of images, and to obtain and store the first reference image. Function blocks S1100, S1200, S1300 and S1400 in FIG. 6 may be substantially the same as described with reference to FIG. 1, so duplicate description may be omitted.

If the touch input is not sensed (S1500: NO at function block S1500), the process may be terminated without obtaining the first reference image.

FIG. 7 illustrates an exemplary method of obtaining the reference image of FIG. 1. Duplicate description with respect to FIG. 1 may be omitted.

Referring to FIG. 7, in the method of obtaining the reference image for the optical object recognition according to this exemplary embodiment, function block S1600 checks whether the display panel or the electronic device is currently in an unused state. The unused state may represent a state in which the display panel is disabled or deactivated, such as when it is not turned on, and may be referred to as an idle state or a power down state. For example, function block S1600 in FIG. 7 may be performed by the processor 140 in FIG. 4.

If the display panel or the electronic device is in the unused state (YES at function block S1600), function blocks S1100, S1200, S1300 and S1400 may be performed to drive the first light sources, to continuously obtain the plurality of images, and to obtain and store the first reference image. The unused state may be or correspond to a low illuminance environment with little external light, such as when the electronic device is in a pocket, bag, or at night, and the reference image obtained in the low illuminance environment may best represent information about the internal structure of the panel, which may correspond well with the interference component. Function blocks S1100, S1200, S1300 and S1400 in FIG. 7 may be substantially the same as described with reference to FIG. 1, so duplicate description may be omitted.

If the display panel or the electronic device is not in the unused state (NO at function block S1600), the process may be terminated without obtaining the first reference image.

In an alternate embodiment, the method of obtaining the reference image for the optical object recognition may be implemented by combining both the examples of FIGS. 6 and 7. For example, a first reference image from a relatively darker ambient environment might be obtained when the sun is down, and a second reference image from a relatively lighter ambient environment might be obtained when the sun is up, with either one but not both being obtained contemporaneously with obtaining the object image. A combined reference image may include an AND, OR, or XOR of the first and second reference images, for example.

FIG. 8 is a flowchart illustrating a sub-function example of obtaining at least one of a plurality of images as a first reference image in function block S1300 of FIG. 1.

Referring to FIGS. 1 and 8, when obtaining the at least one of the plurality of images as the first reference image at function block S1300 of FIG. 1, function block S1310 of FIG. 8, which may be a sub-function of S1300, obtains a plurality of first values by performing a spatial signal processing operation, or an object detection processing operation in a spatial domain, on the plurality of images. For example, the spatial signal processing may represent a scheme or method of directly using pixel values or grayscale values. For example, each of the plurality of first values may be a statistical value, such as but not limited to a variance, based on illuminance. However, embodiments are not limited thereto, and at least one of various techniques may be used.

At least one image among the plurality of images may be selected as the first reference image based on the plurality of first values and a predetermined first threshold value. For example, at function block S1320 of FIG. 8, each of the plurality of first values may be compared with the first threshold value. If the first value is smaller than or equal to the first threshold value (NO at function block S1320), at least one image having the first value smaller than or equal to the first threshold value among the plurality of images may be selected as the first reference image at function block S1330. If the first value is greater than the first threshold value (YES at function block S1320), at least one image having the first value greater than the first threshold value among the plurality of images may be determined as a contaminated or polluted image, or as the first image including the first object at function block S1340.

In an exemplary embodiment, the contaminated image may be an image including an object, such as, for example, a unique pattern of a device storage bag when the electronic device is in the bag, such that the image includes an object other than the first object that is a target object of the optical object recognition.

For another example, the contaminated image may be an image including information of an external light source other than the light source of the display device. Here, the image including the information of the external light source may be removed by analyzing a histogram. An image contaminated by an external light source may have a relatively high pixel value compared to a pixel value indicative of the light source of the display device as reflected by an object, and there may be a relatively large number of pixels having pixel values greater than or equal to a predetermined threshold value in a histogram of the obtained image, and thus it may be determined that the obtained image is contaminated by the external light source when a plurality of pixels having pixel values greater than or equal to the threshold value are detected.

For yet another example, as may be described in greater detail with reference to FIG. 11, the image including the object other than the first object may be removed by analyzing a frequency component.

Figure 9A:
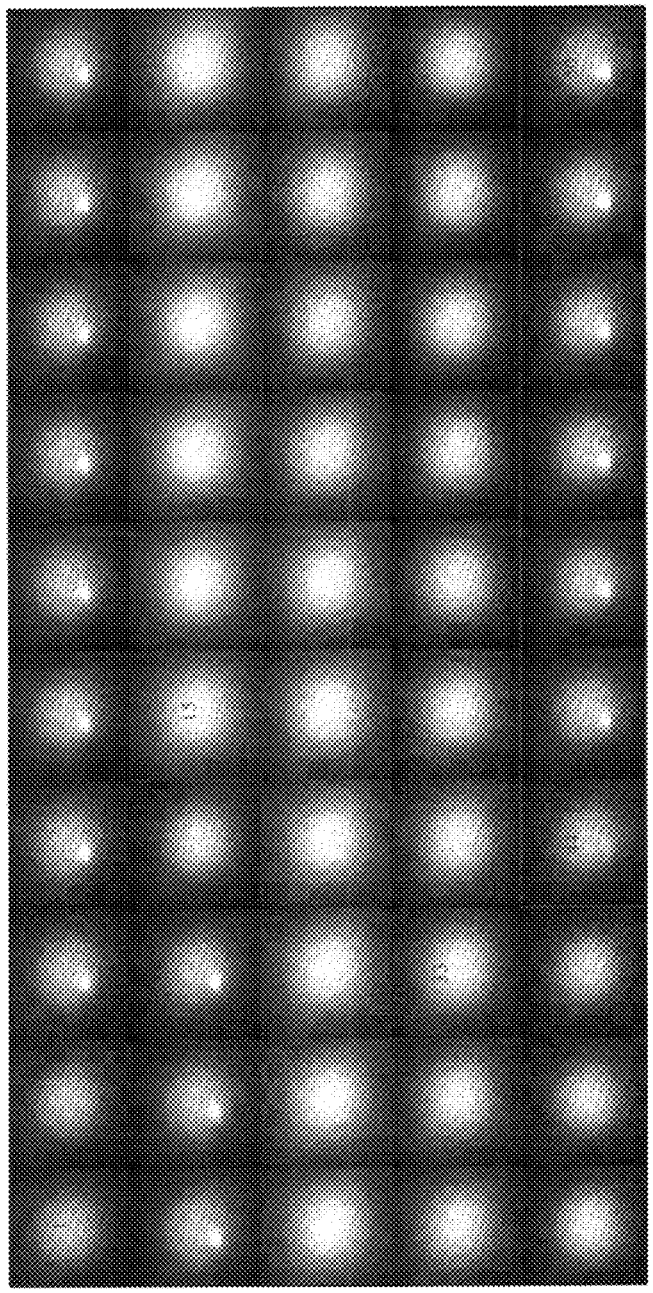
FIGS. 9A, 9B, and 9C are image diagrams for describing an operation of obtaining the at least one of the plurality of images as the first reference image of FIG. 8.
Figure 9B:
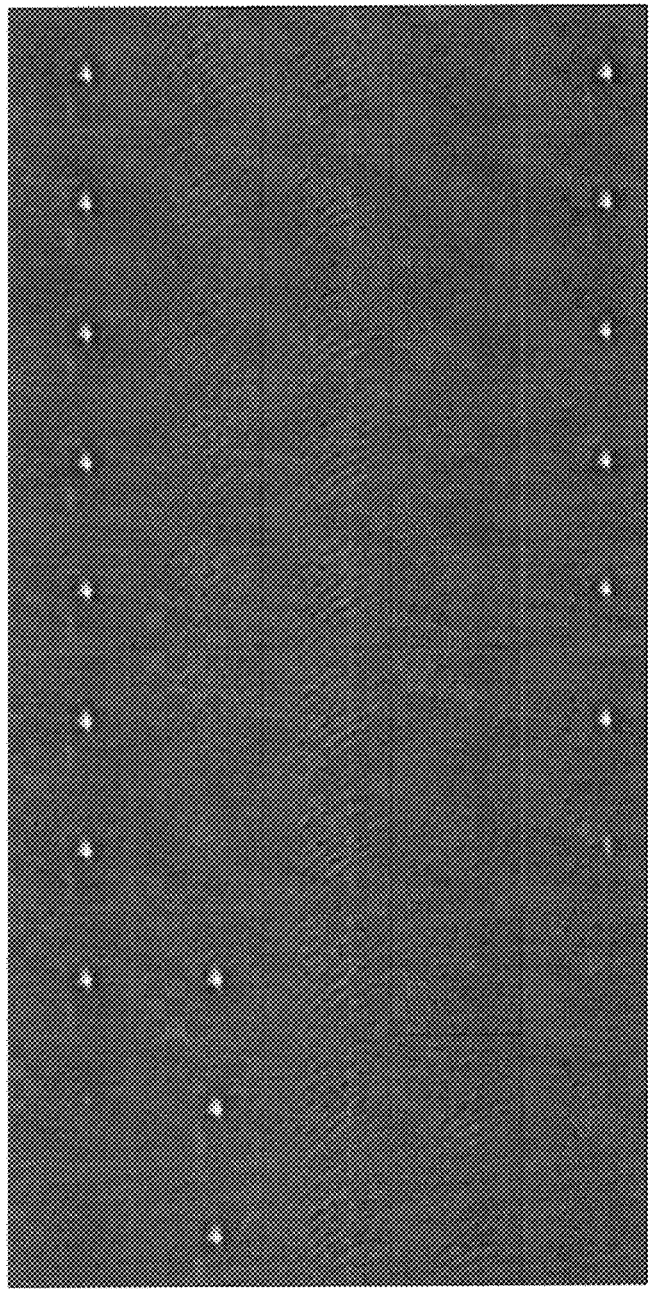
Figure 9C:
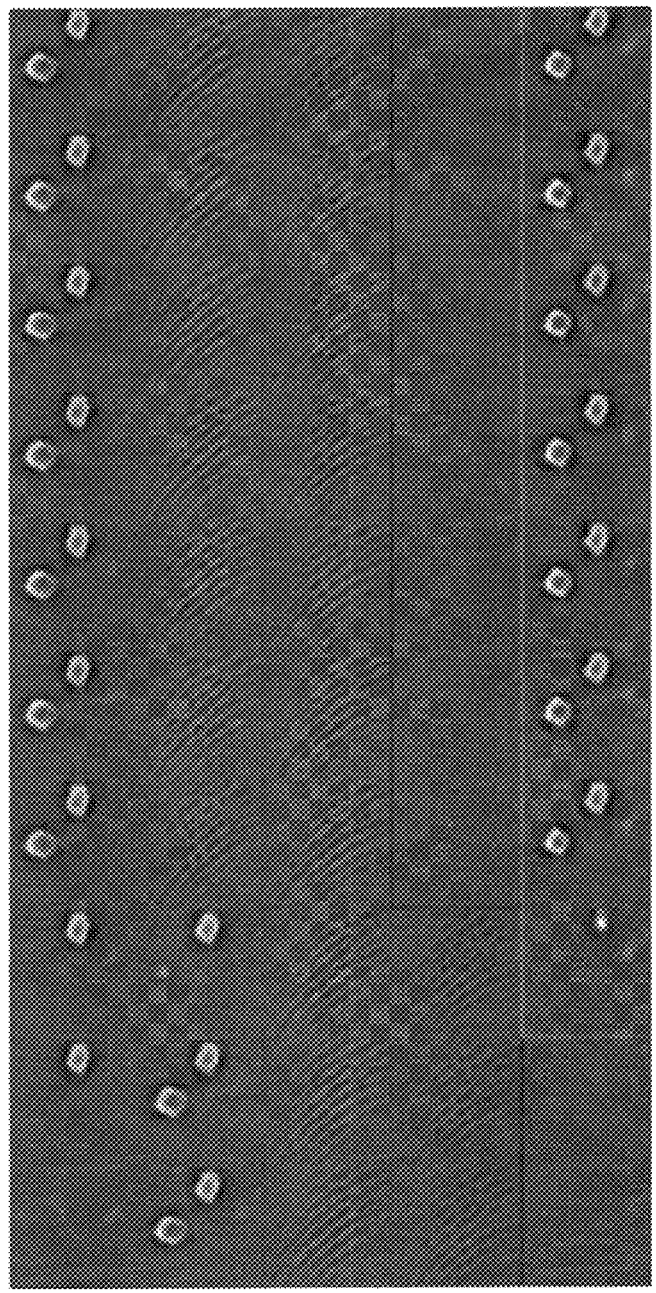

FIGS. 9A, 9B and 9C illustrate an operation of obtaining the at least one of the plurality of images as the first reference image of FIG. 8.

Referring to FIGS. 9A and 9B, images that are continuously captured before and after an image including an object may be obtained. FIG. 9A illustrates images captured at an ambient environmental temperature of about −5 degrees Celsius, and the images of FIG. 9A may include both noise and interference. FIG. 9B illustrates images representing a result of passing differential and signal processing filters on the images of FIG. 9A.

For example, in an image sequence, or at least an order of images where some may have been removed, when continuously capturing images during fingerprint detection, an image contaminated by an external light source may be captured first. Next, as a finger approaches, the external light source may be blocked or obscured by the finger, and an image without an object and without the external light source may be captured. Subsequently, an image including the fingerprint may be captured. As the finger moves away, the external light source may be blocked or obscured again by the finger, and another image without the object and without the external light source may be captured again. Finally, another image contaminated by the external light source may be captured again. In an environment without the external light source, there may be only an object-free image and an image including object without being contaminated by an external light source. Here, the continuous capturing or shooting may support or facilitate using similarities of temporal and spatial information among various information from multiple images.

In FIGS. 9A and 9B, there may be 50 time-wise images from No. 1 to No. 50. At least images of Nos. 3 to 13 may represent images contaminated by an external light source, an image of No. 14 may represent an image in which the external light source is blocked before a fingerprint is input, images of Nos. 15 to 32 may represent images with the fingerprint, images of Nos. 33 to 43 may represent images in which the external light source is blocked after the fingerprint is input, and images of Nos. 44 to 50 may represent images contaminated by the external light source.

Referring to FIG. 9C, there may be 50 images obtained similarly to those of FIG. 9B. Images of Nos. 1 to 13 may represent images contaminated by an external light source, images of Nos. 14 to 33 may represent images with a fingerprint, images of Nos. 34 to 42 may represent images in which the external light source is blocked after the fingerprint is input, and images of Nos. 43 to 50 may represent images contaminated by the external light source. In FIG. 9C, an image in which the external light source is blocked before the fingerprint is input might not exist.

Figure 10:
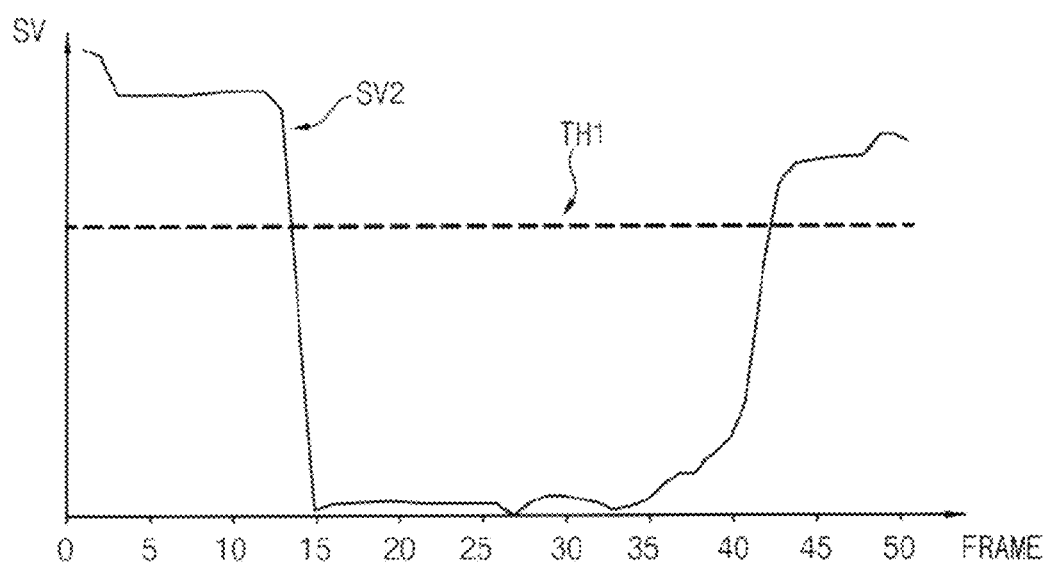
FIG. 10 is a graphical diagram for describing an operation of obtaining the at least one of the plurality of images as the first reference image of FIG. 8.

FIG. 10 illustrates an operation of obtaining the at least one of the plurality of images as the first reference image of FIG. 8.

Referring to FIG. 10, a result of performing function block S1310 in FIG. 8 on the images of FIG. 9A is illustrated. In a graph of FIG. 10, a horizontal axis FRAME represents the frame number of images, and a vertical axis SV represents the first value, here a variance based on illuminance.

As illustrated in FIG. 10, the spatial signal processing may be performed on the 50 images of FIG. 9A to obtain values SV2. At least one of images, such as one or more of the images of Nos. 14 to 43, having a value smaller than or equal to a first threshold value TH1 among the values SV2, may be selected as the first reference image. Each of images having a value greater than the first threshold value TH1 among the values SV2 may be determined to be either a contaminated image or an object image, such as the first image including the first object.

Figure 11:
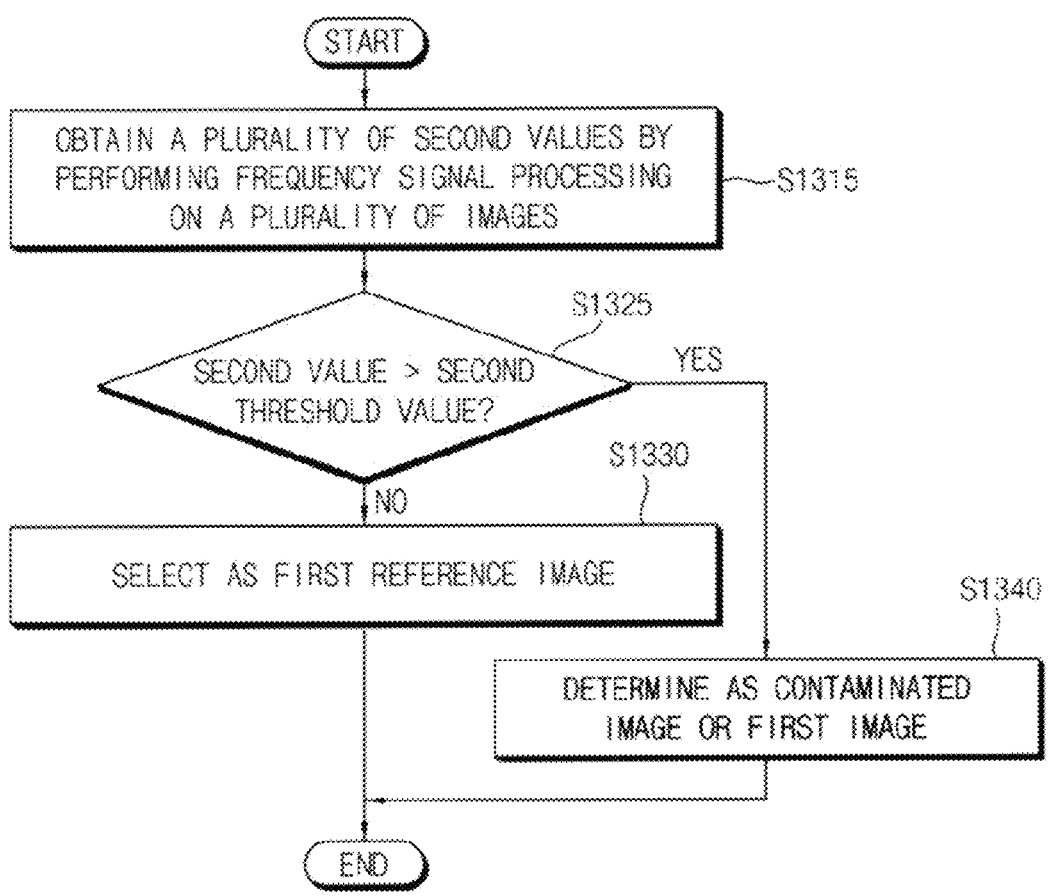
FIG. 11 is a flowchart diagram illustrating another exemplary method of obtaining at least one of a plurality of images as a first reference image in FIG. 1.

FIG. 11 illustrates another example of obtaining at least one of a plurality of images as a first reference image in FIG. 1.

Referring to FIGS. 1 and 11, when obtaining the at least one of the plurality of images as the first reference image at function block S1300 of FIG. 1, a plurality of second values may be obtained by performing a frequency signal processing operation, or an object detection processing operation in a frequency domain, on the plurality of images at function block S1315 of FIG. 11. For example, the frequency signal processing may represent a scheme or method of transforming pixel values or grayscale values into frequency values or bands, and using the transformed frequency values, such as a wavelet transform or a Fourier transform, or the like. For example, each of the plurality of second values may be a result of the Fourier transform. However, embodiments are not limited thereto, and at least one of various techniques may be used.

At least one image among the plurality of images may be selected as the first reference image based on the plurality of second values and a predetermined second threshold value. For example, each of the plurality of second values may be compared with the second threshold value. When the second value smaller than or equal to the second threshold value exists (NO at function block S1325), at least one image having the second value smaller than or equal to the second threshold value among the plurality of images may be selected as the first reference image at function block S1330. When the second value greater than the second threshold value exists (YES at function block S1325), at least one image having the second value greater than the second threshold value among the plurality of images may be determined as the contaminated image or the first image including the first object at function block S1340. For example, the second threshold value may be different from the first threshold value.

In an exemplary embodiment, the contaminated image may be an image including an object other than the first object, which is a target object of the optical object recognition, or may be an image including information of an external light source other than the light source of the display device, as described with reference to FIG. 8.

For example, the image including the object other than the first object may be removed by analyzing a frequency component. Typically, when a signal strength in a frequency band is greater than or equal to a predetermined threshold value, it may be determined that the obtained image is an image including an object, and such image may include a part in which an object of the user is actually measured and an oil component other than the object signal remains in the form of an object.

Figure 12:
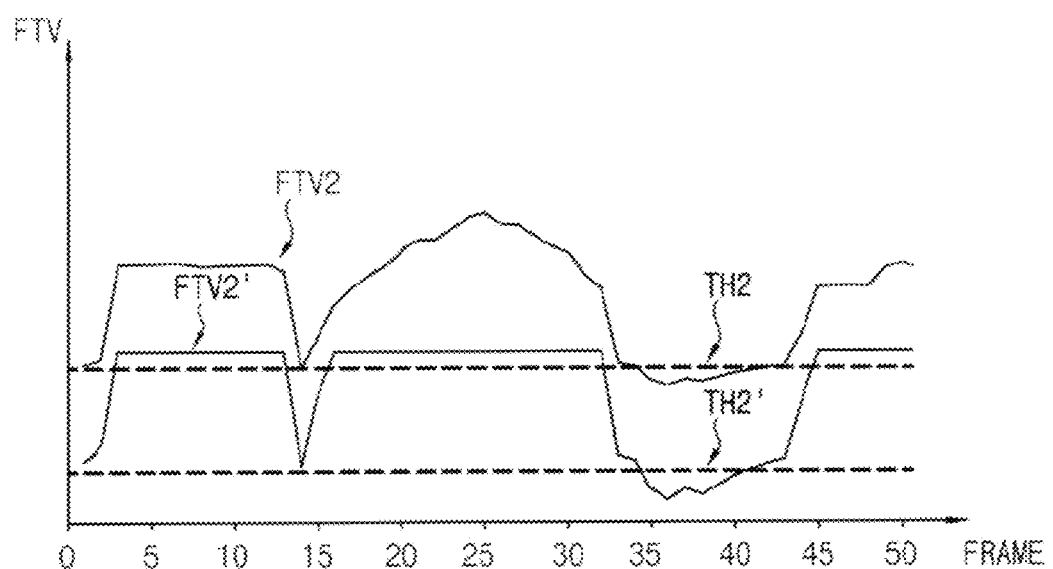
FIG. 12 is a graphical diagram for describing an operation of obtaining the at least one of the plurality of images as the first reference image of FIG. 11.

FIG. 12 is a diagram for describing an operation of obtaining the at least one of the plurality of images as the first reference image of FIG. 11.

Referring to FIG. 12, a result of performing function block S1315 in FIG. 11 on the images of FIG. 9A is illustrated. In a graph of FIG. 12, a horizontal axis FRAME represents the frame number of images, and a vertical axis FTV represents the second value, such as a result of the Fourier transform.

As illustrated in FIG. 12, the frequency signal processing may be performed on the 50 images of FIG. 9A to obtain values FTV2. At least one of images, such as one or more of the images of Nos. 14 and 33 to 43, having a value smaller than or equal to a second threshold value TH2 among the values FTV2 may be selected as the first reference image. Each of images having a value greater than the second threshold value TH2 among the values FTV2 may be determined as the contaminated image or the first image including the first object. Values FTV2' and a threshold value TH2' may be obtained by converting the values FTV2 and the second threshold value TH2, respectively, to facilitate such determination and selection.

Although the examples of FIGS. 8 and 11 are described as separate examples, embodiments are not limited thereto, and the method of obtaining the reference image for the optical object recognition may be implemented by combining both the examples of FIGS. 8 and 11. For example, the plurality of first values may be obtained by performing the spatial signal processing on the plurality of images, the plurality of second values may be obtained by performing the frequency signal processing on the plurality of images, and at least one image among the plurality of images may be selected as the first reference image based on all of the plurality of first values, the first threshold value, the plurality of second values and the second threshold value. At least one image having the first value smaller than or equal to the first threshold value and having the second value smaller than or equal to the second threshold value among the plurality of images may be selected as the first reference image. At least one image having the first value greater than the first threshold value or having the second value greater than the second threshold value among the plurality of images may be determined as the contaminated image or the first image including the first object FIGS. 13A and 13B are diagrams for describing an operation of obtaining the at least one of the plurality of images as the first reference image of FIGS. 8 and 11.

Figure 13A:
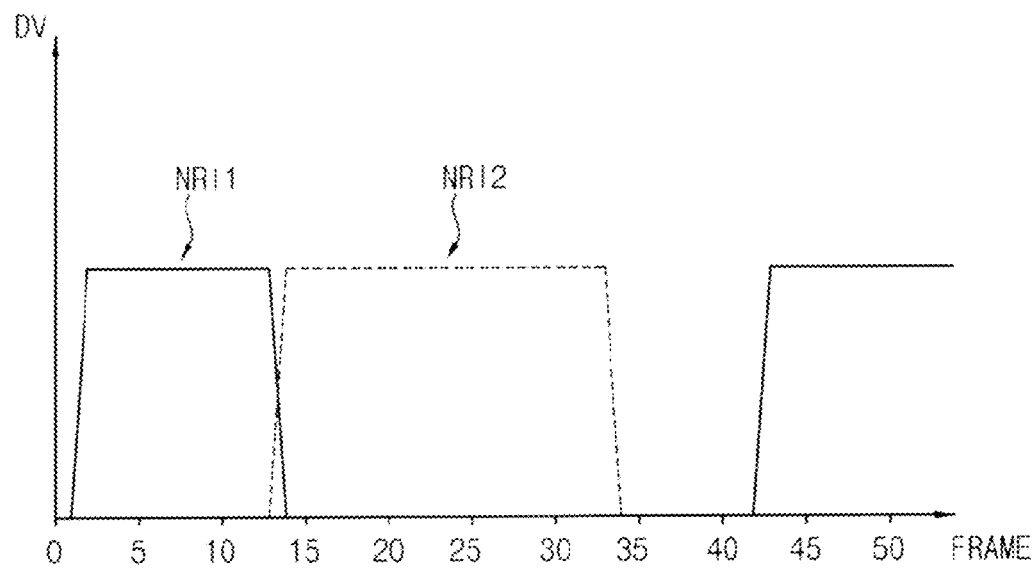
FIGS. 13A and 13B are graphical diagrams for describing an operation of obtaining the at least one of the plurality of images as the first reference image of FIGS. 8 and 11.
Figure 13B:
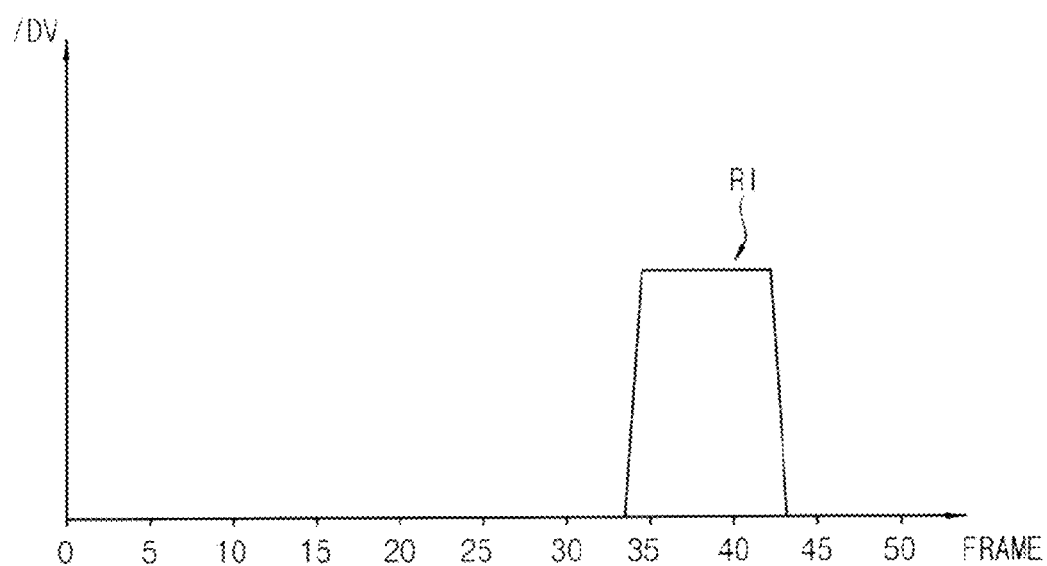

Referring to FIGS. 13A and 13B, a result of performing the method of obtaining the reference image according to an exemplary embodiment by combining the examples of FIGS. 8 and 11 is illustrated. In graphs of FIGS. 13A and 13B, a horizontal axis FRAME represents the frame number of images, and a vertical axis DV or /DV represents a result of determination.

As illustrated in FIG. 13A, operations associated with the example of FIGS. 8 and 10 may be performed first to exclude the images of Nos. 1 to 13 and 44 to 50 from the reference image, where Non-Reference Images NRI1 are illustrated by solid lines indicating images that include the external light source. After then, operations associated with the example of FIGS. 11 and 12 may be performed to exclude the images of Nos. 14 to 33 from the reference image, such as Non-Reference Image NRI2 illustrated by dotted lines indicating images in which there are signals other than noise and interference. Thus, as illustrated in FIG. 13B, the images of Nos. 34 to 43 may be extracted, and at least one of the images of Nos. 34 to 43 may be selected as the first reference image RI.

In an exemplary embodiment, when obtaining the reference image, the reference image may be updated by performing signal processing in the form of a finite impulse response (FIR) or an infinite impulse response (IIR) rather than using only one image. In the FIR, one object-free image with high quality or performance may be obtained by storing and using a specific number of object-free images. In the IIR, one object-free image with high quality may be updated and used whenever a new object-free image is input. In a case of the FIR, object-free images in a specific environment may be collected to obtain an image optimized for the specific environment. In a case of the IIR, updates may be performed slowly but may be applied extensively using accumulated information.

Figure 14:
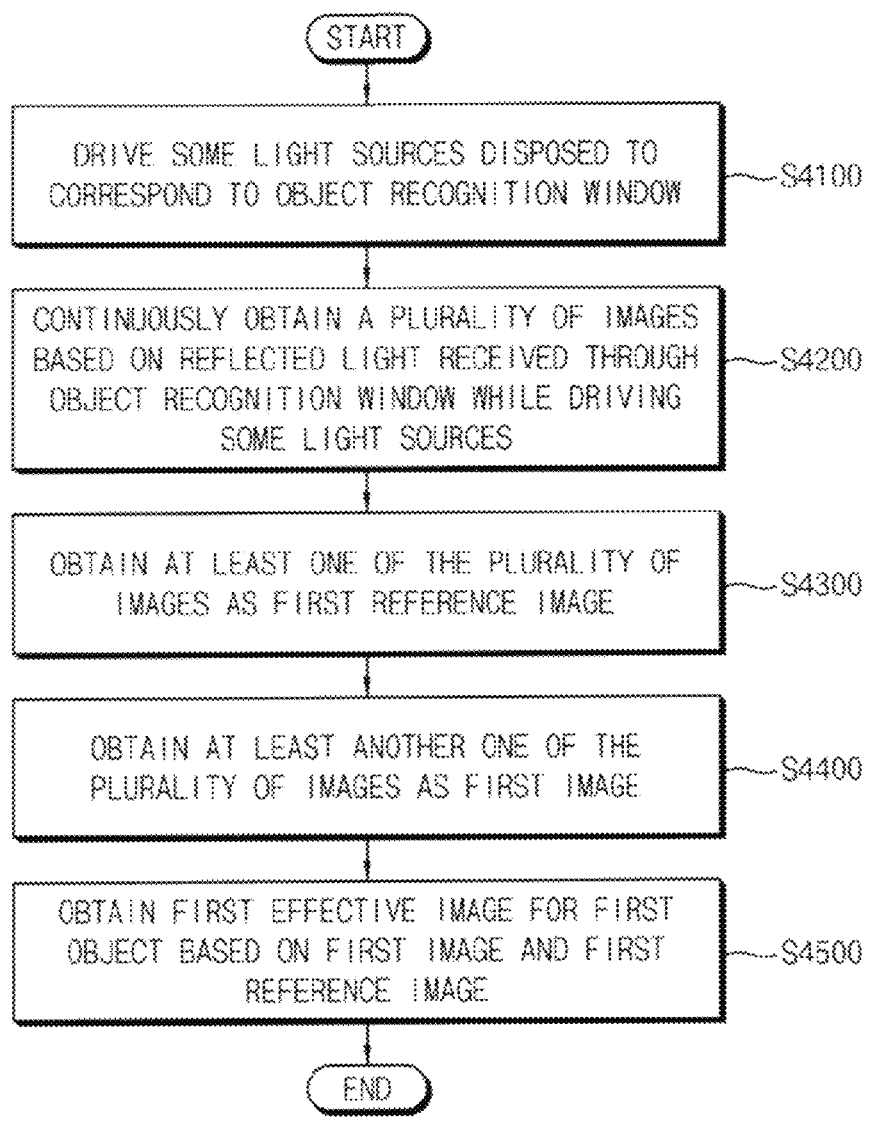
FIG. 14 is a flowchart diagram illustrating a method of performing optical object recognition according to an exemplary embodiment.

FIG. 14 is a flowchart illustrating a method of performing optical object recognition according to an exemplary embodiment. The descriptions repeated with FIG. 1 will be omitted.

Referring to FIG. 14, in a method of performing optical object recognition, function blocks S4100, S4200 and S4300 in FIG. 14 may be substantially the same as function blocks S1100, S1200 and S1300 in FIG. 1, respectively.

In an exemplary embodiment, when a plurality of or multiple reference images are obtained, the FIR or IIR signal processing may be performed on the reference images to combine and/or update the reference images into one reference image.

At least another one of the plurality of images is obtained as a first image at function block S4400. The first image is an image that includes the first object. For example, as illustrated in FIG. 12, one of the images of Nos. 15 to 32 including a relatively high frequency component may be obtained as the first image based on the values FTV2 obtained by performing the frequency signal processing.

A first effective image for the first object is obtained based on the first image and the first reference image at function block S4500. One of the plurality of images that is most suitable for the first image may be selected as the first reference image, and thus efficient optical object recognition may be performed.

Figure 15:
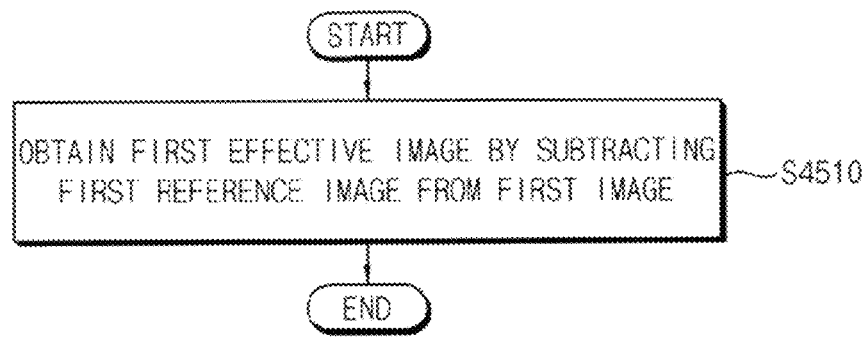
FIG. 15 is a flowchart diagram illustrating an example of obtaining a first effective image in FIG. 14.

FIG. 15 illustrates an example of obtaining a first effective image in FIG. 14.

Referring to FIGS. 14 and 15, when obtaining the first effective image at function block S4500, the first effective image may be obtained by subtracting the first reference image from the first image at function block S4510.

Figure 16A:
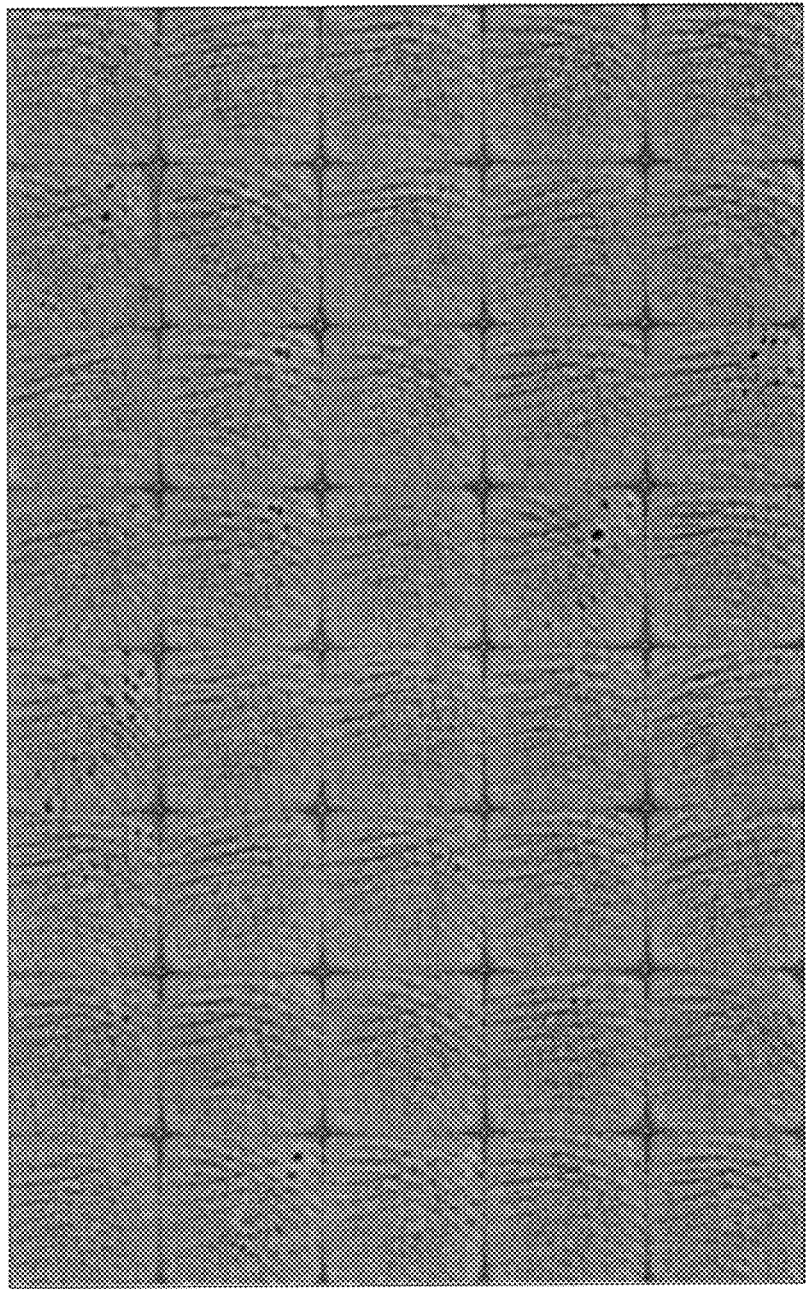
FIGS. 16A and 16B are image diagrams for describing a method of performing optical object recognition according to an exemplary embodiment.
Figure 16B:
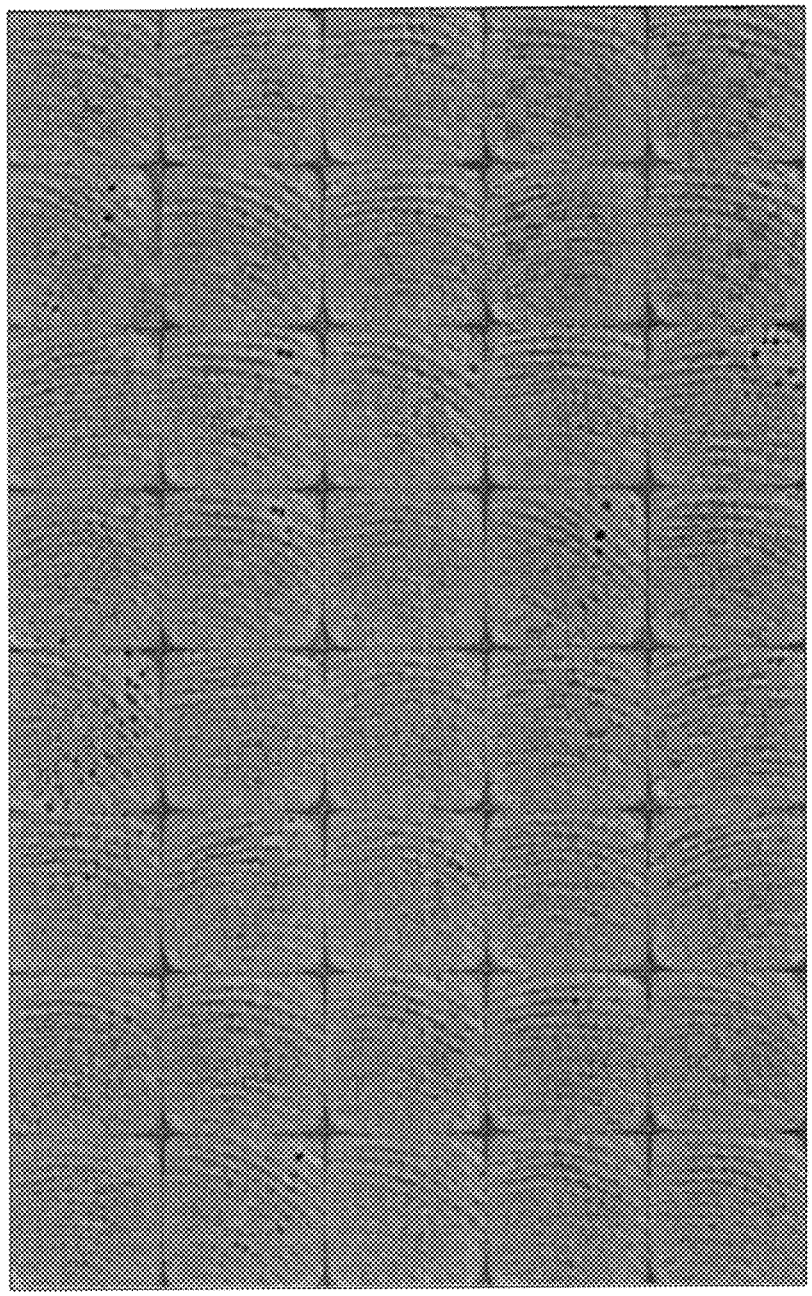

FIGS. 16A and 16B illustrate a method of performing optical object recognition according to exemplary embodiments.

Referring to FIGS. 16A and 16B, images passing the differential and signal processing filters are shown. FIG. 16A illustrates a result of using a reference image obtained in a different environment from that of an object image, such as in environment in which a temperature difference between the reference environment and object environment is relatively large. FIG. 16B illustrates a result of using a reference image obtained in the same environment as an object image according to an exemplary embodiment.

While the interference of grid patterns is prominent in FIG. 16A, the interference and noise are substantially removed in FIG. 16B, so that only the fingerprint remains clearly. This accuracy of this same-temperature image has an effect of distinguishing the ridges and valleys of the fingerprint in fingerprint recognition. In FIG. 16A, the interference and noise are generated regardless of the fingerprint to form multiple lines, and intersections between the lines and the fingerprint may be incorrectly recognized as a characteristic of the fingerprint, thereby significantly degrading the performance of fingerprint matching and increasing the chance of confusing the actual fingerprints with other fingerprints. In contrast, in FIG. 16B, a superior fingerprint image adapted to environmental changes may be obtained.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general-purpose computer, special-purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 17:
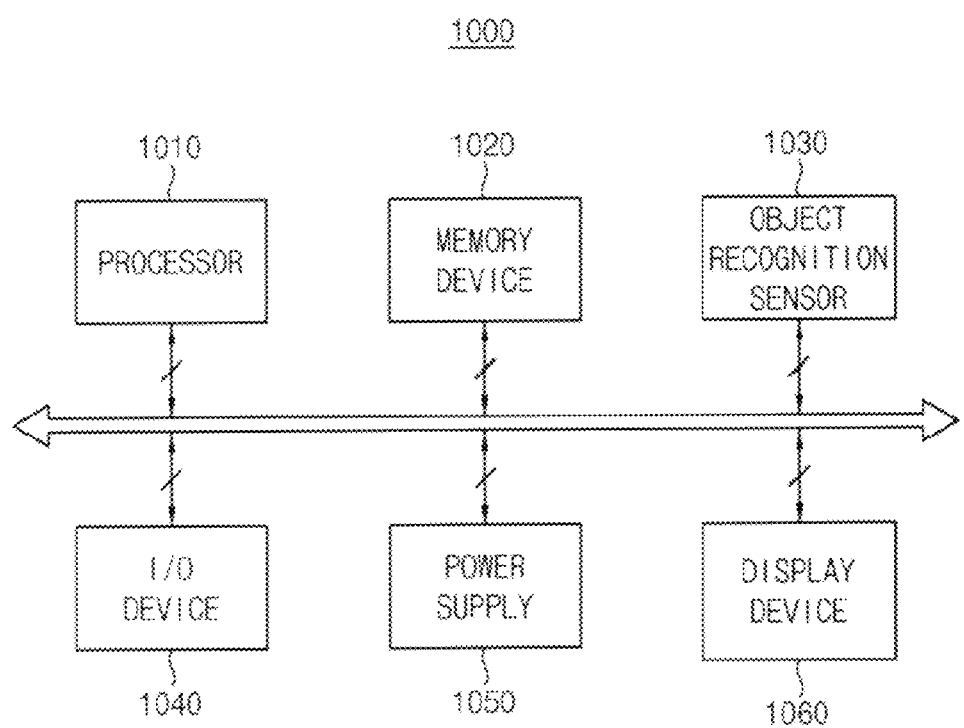
FIG. 17 is a schematic block diagram illustrating an electronic device according to an exemplary embodiment.

FIG. 17 is a block diagram illustrating an electronic device according to an exemplary embodiment.

Referring to FIG. 17, an electronic device 1000 may include a processor 1010, a memory device 1020, an object recognition sensor 1030, an input/output (I/O) device 1040, a power supply 1050 and a display device 1060, each connected to a system interface and/or bus 1070. The electronic device 1000 may further include a plurality of ports for communicating with a video card, a sound card, a memory card, a universal serial bus (USB) device, other electronic devices, or the like.

The processor 1010 controls operations of the electronic device 1000. The processor 1010 may execute an operating system and at least one application to provide an internet browser, games, videos, or the like. The memory device 1020 may store data for the operations of the electronic device 1000. The I/O device 1040 may include an input device such as a keyboard, a keypad, a mouse, a touchpad, a touch-screen, a remote controller, or the like, and an output device such as a printer, a speaker, a display, or the like. The power supply 1050 may provide a power for the operations of the electronic device 1000.

The display device 1060 includes a display panel and a touch sensor panel. The display device 1060, the object recognition sensor 1030, the processor 1010 and the memory device 1020 in FIG. 17 may correspond to the display panel 111, the touch sensor panel 115, the object recognition sensor 130, the processor 140 and the memory 150 of FIG. 4, respectively, and may perform the method of obtaining the reference image according to an embodiment and the method of performing the optical object recognition according to an embodiment, where each of these methods need not have been introduced in the same exemplary embodiment.

The inventive concept may be applied to various electronic devices and systems that include the display panels and the object recognition sensors and perform the optical object recognition. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of exemplary embodiments and is not to be construed as limiting. Although exemplary embodiments have been described, those of ordinary skill in the pertinent art will readily appreciate that many modifications are possible without materially departing from the novel teachings of the described embodiments. Accordingly, all such modifications are intended to be included within the scope of the present disclosure as defined in the claims. Therefore, it is to be understood that the foregoing is illustrative of various exemplary embodiments and is not to be construed as limited to the specific examples disclosed, and that modifications to the disclosed exemplary embodiments, as well as other embodiments, are intended to be included within the scope of the appended claims.

What is claimed is:

1. An optical object recognition method comprising:
   driving first light sources among a plurality of light sources included in a display panel, the first light sources being disposed to correspond to an object recognition window which is a partial region of the display panel;
   obtaining a contemporaneous plurality of sequential image frames based on reflected light received by an object recognition sensor through the object recognition window while driving the first light sources;
   obtaining a plurality of first values by performing a spatial domain signal processing operation on the plurality of sequential image frames;
   obtaining a plurality of second values by performing a frequency domain signal processing operation on the plurality of sequential image frames;
   obtaining one of the plurality of sequential image frames as a first reference image for optical object recognition associated with a first object based on the plurality of first values and the plurality of second values; and
   storing the first reference image; and
   obtaining another one of the plurality of sequential image frames as a first object image for optical object recognition associated with the first object based on the plurality of first values and the plurality of second values,
   wherein the first reference image is an image that does not include the first object,
   wherein the first object image is an image that includes the first object.

2. The method of claim 1, wherein:
   the first reference image is an image obtained in a same environment as the first object image immediately before or immediately after the first object image among the plurality of sequential image frames that are obtained.

3. The method of claim 1, further comprising:
   sensing, by a touch sensor panel, a touch input of a user, and
   wherein, when the touch input is sensed, the first light sources are driven, the plurality of sequential image frames are sequentially obtained, and the first reference image is obtained and stored.

4. The method of claim 1, further comprising:
   checking whether the display panel or an electronic device including the display panel has an unused state, and
   wherein, when the display panel or the electronic device has the unused state, the first light sources are driven, the plurality of sequential image frames are sequentially obtained, and the first reference image is obtained and stored.

5. The method of claim 1, wherein obtaining the one of the plurality of sequential image frames as the first reference image includes:
   selecting the one image among the plurality of sequential image frames as the first reference image based on the plurality of first values and a predetermined first threshold value.

6. The method of claim 5, wherein, among the plurality of sequential image frames, the one image having a respective first value smaller than or equal to the first threshold value is selected as the first reference image.

7. The method of claim 1, wherein obtaining the one of the plurality of sequential image frames as the first reference image includes:
selecting the one image among the plurality of sequential image frames as the first reference image based on the plurality of second values and a predetermined second threshold value.

8. The method of claim 7, wherein, among the plurality of sequential image frames, the one image having a respective second value smaller than or equal to the second threshold value is selected as the first reference image.

9. The method of claim 1, wherein obtaining the one of the plurality of sequential image frames as the first reference image includes:
selecting the one image among the plurality of sequential image frames as the first reference image based on the plurality of first values, a predetermined first threshold value, the plurality of second values, and a predetermined second threshold value.

10. The method of claim 9, wherein, among the plurality of sequential image frames, the one image having a respective first value smaller than or equal to the first threshold value and having a respective second value smaller than or equal to the second threshold value is selected as the first reference image.

11. The method of claim 1, wherein the first reference image is an image that does not include the first object, the method further comprising:
obtaining a first effective image for the first object based on the first object image and the first reference image.

12. The method of claim 11, wherein obtaining the first effective image includes:
obtaining the first effective image by subtracting the first reference image from the first object image.

13. An electronic device comprising:
a display panel including a plurality of light sources, the display panel configured to drive first light sources among the plurality of light sources to display an object recognition window on a partial region of the display panel;
an object recognition sensor configured to continuously obtain a plurality of sequential image frames contemporaneously in a same environment based on reflected light received through the object recognition window while driving the first light sources;
a processor configured to obtain a plurality of first values by performing a spatial domain signal processing operation on the plurality of sequential image frames, obtain a plurality of second values by performing a frequency domain signal processing operation on the plurality of sequential image frames, obtain one of the plurality of sequential image frames as a first reference image for optical object recognition associated with a first object based on the plurality of the first values and the plurality of second values, the first reference image being an image that does not include the first object, obtain another one of the plurality of sequential image frames as a first object image for optical object recognition associated with the first object based on the plurality of first values and the plurality of, second values, the first object image being an image that includes the first object; and
a memory configured to store the first reference image.

14. The electronic device of claim 13, further comprising:
a touch sensor panel configured to sense a touch input of a user,
wherein the processor is configured to check whether the display panel or the electronic device has an unused state, and
wherein, when the touch input is sensed or when the display panel or the electronic device has the unused state, the display panel is configured to drive the first light sources, the object recognition sensor is configured to continuously obtain the plurality of sequential image frames, the processor is configured to obtain the first reference image, and the memory is configured to store the first reference image.

15. A biometric device comprising:
a plurality of light-emitting pixels disposed behind a pattern recognition window of a larger display panel;
a plurality of light-sensing pixels disposed behind the light-emitting pixels in a reflective light path from the pattern recognition window;
a plurality of memory cells in signal communication with the plurality of light-sensing pixels, respectively, wherein the plurality of memory cells is configured to receive from the plurality of light-sensing pixels a plurality of sequential image frames; and
a processor configured to obtain a plurality of first values by performing a spatial domain signal processing operation on the plurality of sequential image frames, obtain a plurality of second values by performing a frequency domain signal processing operation on the plurality of sequential image frames, obtain one of the plurality of sequential image frames as a reference image based on the plurality of first values and image frames as a raw image based on the plurality of first values and the plurality of second values,
wherein the raw image and the reference image are contemporaneous,
wherein the reference image is indicative of a shadow cast by at least the plurality of light-emitting pixels when light emitted by the plurality of light-emitting pixels is reflected back through the pattern recognition window.

16. The biometric device of claim 15, wherein the plurality of memory cells is further configured to subtract the reference image from the raw image acquired by the light-sensing pixels to form a pure biometric pattern image.

17. The biometric device of claim 16, wherein the pure biometric pattern image is indicative of at least one of a fingerprint, an iris, or a face.

18. The biometric device of claim 15, further comprising a touch sensor configured to activate at least one of the plurality of light-emitting pixels or the plurality of light-sensing pixels.

19. The biometric device of claim 15, further comprising a plurality of optical devices disposed in front of the plurality of light-sensing pixels to concentrate or focus reflected light upon the plurality of light-sensing pixels.

20. The biometric device of claim 15, wherein the reference image and the raw image are obtained in a same environment.

* * * * *